United States Patent
Yamamoto et al.

[11] Patent Number: 6,150,027
[45] Date of Patent: *Nov. 21, 2000

[54] GLASS COMPOSITION, STRUCTURE, AND APPARATUS USING THE SAME

[75] Inventors: Hiroki Yamamoto, Hitachi; Takashi Naito, Hitachiota; Takashi Namekawa, Hitachi; Ken Takahashi, Ibaraki-ken; Noriyuki Kumasaka, Ome; Kenkichi Inada, Hitachinaka, all of Japan

[73] Assignee: Hitachi, LTD, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,193

[22] Filed: Jun. 12, 1996

[30] Foreign Application Priority Data

Jun. 16, 1995 [JP] Japan .................................. 7-149961

[51] Int. Cl.⁷ .................................. B32B 17/00
[52] U.S. Cl. .......................... 428/426; 428/469; 501/4; 501/15; 501/74; 501/75; 501/78; 65/33.1; 65/33.5; 65/33.9
[58] Field of Search .................. 501/4, 15, 74, 501/75, 78; 428/426, 469; 65/28, 33.1, 33.5, 33.9

[56] References Cited

U.S. PATENT DOCUMENTS

| | | | |
|---|---|---|---|
| 4,537,862 | 8/1985 | Francel | 501/78 |
| 4,816,949 | 3/1989 | Yamada | 360/120 |
| 4,855,261 | 8/1989 | Mizuno | 501/76 |
| 5,204,293 | 4/1993 | Amundson, Jr. | 501/72 |
| 5,224,001 | 6/1993 | Mizuno | 360/125 |
| 5,245,492 | 9/1993 | Mizuno | 360/125 |
| 5,284,706 | 2/1994 | O'Donnelly | 501/15 |

*Primary Examiner*—Timothy M. Speer
*Attorney, Agent, or Firm*—Kenyon & Kenyon

[57] ABSTRACT

Provided are a glass such as a sealing glass which contains a rare earth element and crystalline particles, a structure made by sealing with said sealing glass, a magnetic head made by bonding using said sealing glass, and a magnetic recording and reproducing apparatus on which said magnetic heads are mounted. According to the glass of the present invention, magnetic heads, and other structures can be bonded at low temperatures and a high bond strength can be attained, and thus, magnetic heads having high-speed sliding properties and magnetic recording and reproducing apparatuses of high reliability can be obtained. The glass can be also used for heat resistant parts such as a pannel glass for a cathode-ray tube and the like.

26 Claims, 26 Drawing Sheets

100nm

10nm

101···REVOLVING CYLINDER
102···HEAD SUPPORT
103a,103b···HEAD BASE
110a,111a,111b···HEAD CHIP
112a,112b···OPENING
106a,106b···NOTCH
109a,109b···NOTCH
110b···HEAD CHIP

GLASS COMPOSITION, STRUCTURE, AND APPARATUS USING THE SAME

BACKGROUND OF THE INVENTION

The present invention relates to a glass material, in particular, a sealing glass, and a magnetic head made by bonding with the sealing glass and a magnetic recording and reproducing apparatus using the magnetic head. Moreover, the glass material of the present invention can have a high strength without increasing a melting point. Therefore, the glass material can be also used for heat resistant parts such as a pannel glass for a cathode-ray tube and a Pyrex glass, and additionally, can be further used for a pannel glass for a liquid crystal display.

Hitherto, a sealing glass which can be handled at a temperature lower than the resisting temperature of various parts has been used for bonding of core materials of magnetic heads to be mounted on magnetic recording and reproducing apparatuses such as VTR or bonding of semiconductor sensors, covering of electronic circuit parts such as IC and LSI, and sealing of electron tubes. When the resisting temperature of the parts is high, sealing glasses of $SiO_2$—$B_2O_3$ type or PbO—$SiO_2$ type are used which are relatively high in chemical endurance or mechanical strength, but when the resisting temperature is low, sealing glasses of PbO—$B_2O_3$ type are mainly used.

At present, in the case of magnetic heads for VTR, single crystal Mn—Zn ferrites having a saturated magnetic flux density (Bs) of about 5000 gausses are used as the magnetic core materials. Since the resisting temperature of these ferrites is about 800° C., glasses of PbO—$SiO_2$—$R_2O$ type or ZnO—$B_2O_3$—$SiO_2$—$R_2O$—RO type which can perform the bonding at 700–800° C. are used as the bonding glass. Here, $R_2O$ means an alkali metal oxide and RO means an alkaline earth metal oxide. With recent development in higher performance magnetic recording and reproducing apparatuses and high-recording density magnetic recording media, Co-based amorphous metal magnetic films or sendust alloy films having a Bs of about 10000 gausses and magnetic films mainly composed of iron element and having a Bs of 12000 gausses or more, such as Fe—N or Fe—C magnetic films, have been developed for magnetic heads.

These magnetic films have a high saturated magnetic flux density while they are considerably lower in resisting temperature than Mn-Zn ferrites. Therefore, the bonding temperature is lower than 480° C. for Co-based amorphous metal magnetic films, about 600° C. for sendust alloy films, 500–550° C. for Fe—N magnetic films, and 550–600° C. for Fe—C magnetic films. Thus, a PbO—$B_2O_3$ sealing glass which can perform the bonding at lower than these resisting temperatures is used as disclosed in JP-A-63-170240, JP-A-63-298807, JP-A-3-265539, JP-A-2-184541, JP-A-2-258649, etc. Moreover, it is proposed to use a $V_2O_5$—$P_2O_5$ sealing glass as disclosed in JP-A-4-132634.

In the above conventional techniques, no sufficient consideration has been taken to satisfy simultaneously the three conditions of bonding ability at low temperatures of lower than 600° C., sufficient mechanical strength and sufficient deaeration. Recently, the demand for high density recording of magnetic recording and reproducing apparatuses is further increased and the magnetic heads mounted thereon are required to have a high output and a sufficient strength to stand the use under further severer conditions. As magnetic core materials which can meet the demands, Fe—C or Fe—N magnetic films very high in saturated magnetic flux density are studied, and, hence, glasses which can carry out sealing at low temperatures of lower than 600° C. must be used.

Furthermore, in order to improve tape touch between the magnetic head and the magnetic recording medium, the sliding width between the magnetic head and the magnetic recording medium must be reduced. Moreover, in order to increase recording capacity, the relative speed of the magnetic head and the magnetic recording medium must be markedly increased than usual.

For these reasons, the glass bonding part of magnetic heads is exposed to the severer use atmosphere. Therefore, the conventional sealing glass capable of performing the bonding at low temperatures are insufficient in mechanical strength and breakage sometimes occurs from the glass bonding part during the sliding of tape. That is, the glasses disclosed in JP-A-63-170240, JP-A-63-298807 and JP-A-3-265539 are insufficient in mechanical strength and can hardly stand the above-mentioned use atmosphere.

The sealing glasses disclosed in JP-A-2-184541 and JP-A-2-258649 are superior in mechanical strength, but since they contain many crystallizing components, viscosity of the glass can be adjusted with difficulty and deaeration can be controlled with difficulty. The sealing glass disclosed in JP-A-4-132634 contains $P_2O_5$ and there is the possibility of generation of bubbles produced by water contained in the starting materials.

JP-A-1-138150 discloses a low melting point glass mainly composed of PbO, $TeO_2$, $P_2O_5$ and the like, and containing fluorine and rare earth metal oxides, i.e., $Y_2O_3$, $La_2O_3$ and $Gd_2O_3$. However, it is hard to enhance the strength of this type of a glass because the rare earth metal oxides are incorporated into the glass structure and crystalline particles are not generated owing to $P_2O_5$ and fluorine contained therein.

SUMMARY OF THE INVENTION

An object of the present invention is to provide a sealing glass excellent in low-temperature bonding ability, high in mechanical strength and less in generation of bubbles, a method for producing the glass, and a structure made using the glass.

Another object of the present invention is to provide a magnetic head of high performance and high reliability which can stand severe conditions such as use in high-vision digital VTR and others and a method for making the same, and a magnetic recording and reproducing apparatus of high performance and high reliability on which the magnetic head is mounted.

According to the present invention, there is provided a glass containing a rare earth element and crystalline particles. The glass can be used for a sealing glass and heat resistant parts such as a pannel glass for a cathode ray tube and the like.

The sealing glass of the present invention for attaining the above objects is a sealing glass containing at least one rare earth element and, in this glass, fine particles are uniformly dispersed in its matrix. Said fine particles contain at least one of rare earth elements. These rare earth elements are Pr, Nd, Sm, Eu, Gd, Tb, Dy, Ho, Er, Tm, Yb and Lu. Furthermore, the fine particles have a particle size of 1–50 nm, more preferably 3–10 nm. Moreover, the fine particles are crystalline. Said matrix contains a heavy metal oxide and boron oxide and/or silicon oxide. The heavy metal oxide is preferably an oxide of lead.

The sealing glass of the present invention contains, in terms of the following oxides, PbO: 44–91% by weight, $B_2O_3$: at least 6% by weight, $SiO_2$: 0–30% by weight, the total content of $B_2O_3$ and $SiO_2$: 6–40% by weight and $Ln_2O_3$ (Ln: Pr, Nd, Sm. Eu, Gd, Tb, Dy, Ho, Er, Tm, Yb and Lu): 0.3–2.9% by weight, and fine particles are uniformly dispersed therein. More preferably, the sealing glass contains, in terms of the following oxides, PbO: 44–77% by weight, $B_2O_3$: 6–20% by weight, $SiO_2$: 0–30% by weight, the total content of $B_2O_3$ and $SiO_2$: 6–40% by weight, at least one of ZnO, $Al_2O_3$ and $R_2O$ (R: an alkali metal element): 0–25% by weight and $Ln_2O_3$ (Ln: Pr, Nd, Sm, Eu, Gd, Tb, Dy, Ho, Er, Tm, Yb and Lu): 0.5–1.5% by weight, and the fine particles are uniformly dispersed therein.

Furthermore, the sealing glass of the present invention is a sealing glass containing at least one of rare earth elements, and in this glass, fine particles and low-expansion fillers are uniformly dispersed in the matrix. Said fine particles contain at least one of the rare earth elements. The rare earth elements are Pr, Nd, Sm, Eu, Gd, Tb, Dy, Ho, Er, Tm, Yb and Lu. The fine particles have a particle size of 1–50 nm and the matrix contains an oxide of lead and boron oxide and/or silicon oxide. The low-expansion filler is at least one of zirconium silicate, lead titanate, β-eucryptite, and silica glass.

The method for producing the glass according to the present invention includes a step of heating a mixed powder of glass raw materials in a crucible to obtain a glass melt, a step of precipitating fine particles in the glass melt, a step of continuously stirring the glass melt by vibration generated by a vibrator provided in contact with outer wall of the crucible, a step of cooling the glass melt to obtain a glass, and a step of reheating the glass and annealing it. The raw materials for the glass contain the elements of rare earth, lead, and boron and/or silicon. The rare earth elements are Pr, Nd, Sm, Eu, Gd, Tb, Dy, Ho, Er, Tm, Yb and Lu. The fine particles have a particle size of 1–50nm.

Furthermore, the structure of the present invention comprises at least a substrate and a sealing glass coated on the surface thereof, and this sealing glass contains at least one of rare earth elements and comprises a matrix in which fine particles are uniformly dispersed. The structure further comprises at least a pair of substrates and a sealing glass provided therebetween. The pair of the substrates are bonded with the sealing glass, and this sealing glass contains at least one of rare earth elements and comprises a matrix in which fine particles are uniformly dispersed.

Said fine particles contain at least one of rare earth elements. The rare earth elements are Pr, Nd, Sm, Eu, Gd, Tb, Dy, Ho, Er, Tm, Yb and Lu. The fine particles have a particle size of 1–50 nm and the matrix contains an oxide of lead and boron oxide and/or silicon oxide.

Next, the magnetic head of the present invention comprises a pair of magnetic cores, a non-magnetic gap material provided between the magnetic cores and a sealing glass which bonds the pair of the magnetic cores. This sealing glass contains at least one of rare earth elements and comprises a matrix in which fine particles are uniformly dispersed. The fine particles contain at least one of the rare earth elements. The rare earth elements are Pr, Nd, Sm, Eu, Gd, Tb, Dy, Ho, Er, Tm, Yb and Lu. The fine particles have a particle size of 1–50 nm, preferably 3–10 nm, and the matrix contains an oxide of lead and boron oxide and/or silicon oxide.

The magnetic head of the present invention comprises a pair of magnetic cores, a non-magnetic gap material provided between the magnetic cores and a sealing glass which bonds the pair of the magnetic cores. The sealing glass contains, in terms of the following oxides, PbO: 44–77% by weight, $B_2O_3$: 6–20% by weight, $SiO_2$: 0–25% by weight, the total content of $B_2O_3$ and $SiO_2$: 6–30% by weight, $Ln_2O_3$ (Ln: Pr, Nd, Sm, Eu, Gd, Tb, Dy, Ho, Er, Tm, Yb and Lu): 0.5–1.5% by weight and the remainder of at least one of $Al_2O_3$, ZnO and $R_2O$ (R: an alkali metal element), and fine particles are uniformly dispersed therein. The above sealing glass has a micro Vickers hardness Hv of 425 or higher. Said magnetic core comprises a support on which a magnetic film is formed, and more preferably, the magnetic film is a Fe-based film.

The magnetic head of the present invention comprises a pair of magnetic cores on which magnetic films are formed, only the gap part being butting faces, a non-magnetic gap material provided between the pair of the magnetic cores and a sealing glass, and this sealing glass bonds the butting faces to each other. The sealing glass contains at least one of rare earth elements and this glass comprises a matrix in which fine particles are uniformly dispersed. Said fine particles contain at least one of rare earth elements. The rare earth elements are Pr, Nd, Sm, Eu, Gd, Tb, Dy, Ho, Er, Tm, Yb and Lu. The fine particles have a particle size of 1–50 nm, more preferably 3–10 nm. Said matrix contains an oxide of lead and boron oxide and/or silicon oxide. More preferably, the magnetic film is Fe-based film. It is preferred that the sliding width between the magnetic head and the recording medium is 65 μm or less.

The method for making the magnetic head according to the present invention includes a step of forming a non-magnetic gap material at the butting part of at least a pair of magnetic cores, a step of butting the pair of the magnetic cores, a step of sealing them with a sealing glass containing at least one of the rare earth elements, and a step of precipitating fine particles in the sealing glass. The step of precipitating the fine particles is conducted by a heat treatment at a temperature lower than the resisting temperature of the magnetic cores. The fine particles contain at least one of rare earth elements. The rare earth elements are Pr, Nd, Sm, Eu, Gd, Tb, Dy, Ho, Er, Tm, Yb and Lu. The fine particles have a particle size of 1–50 nm, more preferably 3–10 nm. The sealing glass contains an oxide of lead and boron oxide and/or silicon oxide.

The magnetic recording and reproducing apparatus of the present invention is provided with at least magnetic heads comprising a pair of magnetic cores composed of a support on which a magnetic film is formed, said magnetic cores being bonded with a sealing glass through a non-magnetic gap material, a cylinder part fitted with a plurality of the magnetic heads, a driving part for the cylinder part, and a control part carrying out the information processing from the information recording medium. The sealing glass contains at least one of rare earth elements and comprises a matrix in which fine particles are uniformly dispersed.

The fine particles contain at least one of the rare earth elements. The rare earth elements are Pr, Nd, Sm, Eu, Gd, Tb, Dy, Ho, Er, Tm, Yb and Lu. Furthermore, the fine particles have a particle size of 1–50 nm, more preferably 3–10 nm. Said matrix contains an oxide of lead and boron oxide and/or silicon oxide.

Furthermore, the magnetic recording and reproducing apparatus of the present invention is provided with a magnetic head constructed of a pair of magnetic cores having magnetic films, only the gap parts thereof being butting faces, a non-magnetic gap material provided between the pair of the magnetic cores and a sealing glass which bonds the butting faces to each other; a jig for fitting one or more of the magnetic heads; a cylinder part fitted with a plurality of the fitting jigs; a driving part for the cylinder part; and a control part which carries out processing of information from the information recording medium. The sealing glass contains at least one of rare earth elements and comprises a matrix in which fine particles are uniformly dispersed. The fine particles contain at least one of said rare earth elements, and the rare earth elements are Pr, Nd, Sm, Eu, Gd, Tb, Dy, Ho, Er, Tm, Yb and Lu. Furthermore, the fine particles have a particle size of 1–50 nm, more preferably 3–10 nm. Said matrix contains an oxide of lead and boron oxide and/or silicon oxide. In the magnetic head mounted on the magnetic recording and reproducing apparatus of the present invention, the magnetic film is preferably Fe-based film, and desirably, the sliding width between the magnetic head and the recording medium is 65 μm or less. Moreover, the relative speed of the magnetic head and the recording medium is preferably 20 m/sec or more.

The present invention resides in a sealing glass, characterized in that the glass comprises, in terms of the following oxides and by weight, 30–93% of PbO, 25% or less of $B_2O_3$ and 30% or less of $SiO_2$ and has a micro Vickers hardness of 370 or higher and the viscosity of the glass reaches $10^4$ poises at 600° C. or lower.

Furthermore, the present invention resides in the above sealing glass, characterized in that the glass additionally contains at least one of 10% or less of $Al_2O_3$, 15% or less of ZnO, 15% or less of $Na_2O$, 15% or less of $K_2O$, 15% or less of $Bi_2O_3$, 10% or less of $TeO_2$, 10% or less of $Fe_2O_3$, 5% or less of SrO and 5% or less of $TiO_2$ and, optionally, $Ln_2O_3$ (Ln is at least one of Sc, Y, La and lanthanides).

The present invention resides in a high-definition magnetic recording and reproducing apparatus, characterized in that the apparatus is provided with magnetic heads comprising a pair of magnetic cores composed of a magnetic film formed on a support, said magnetic cores being bonded to each other with a sealing glass through a non-magnetic gap material; a cylinder part fitted with a plurality of the magnetic heads; a driving part for the cylinder part; and a control part which carries out processing of the information from the information recording medium comprising a tape having a metal magnetic film, and that the relative speed of the cylinder part and the information recording medium is 20 m/sec or higher or 50 m/sec or higher, the sliding width between the magnetic head and the information recording medium is 65 μm or less, and the time required for breaking the magnetic head by rotation of the cylinder part and sliding with the information recording medium is 500 hours or more.

Figure 1:
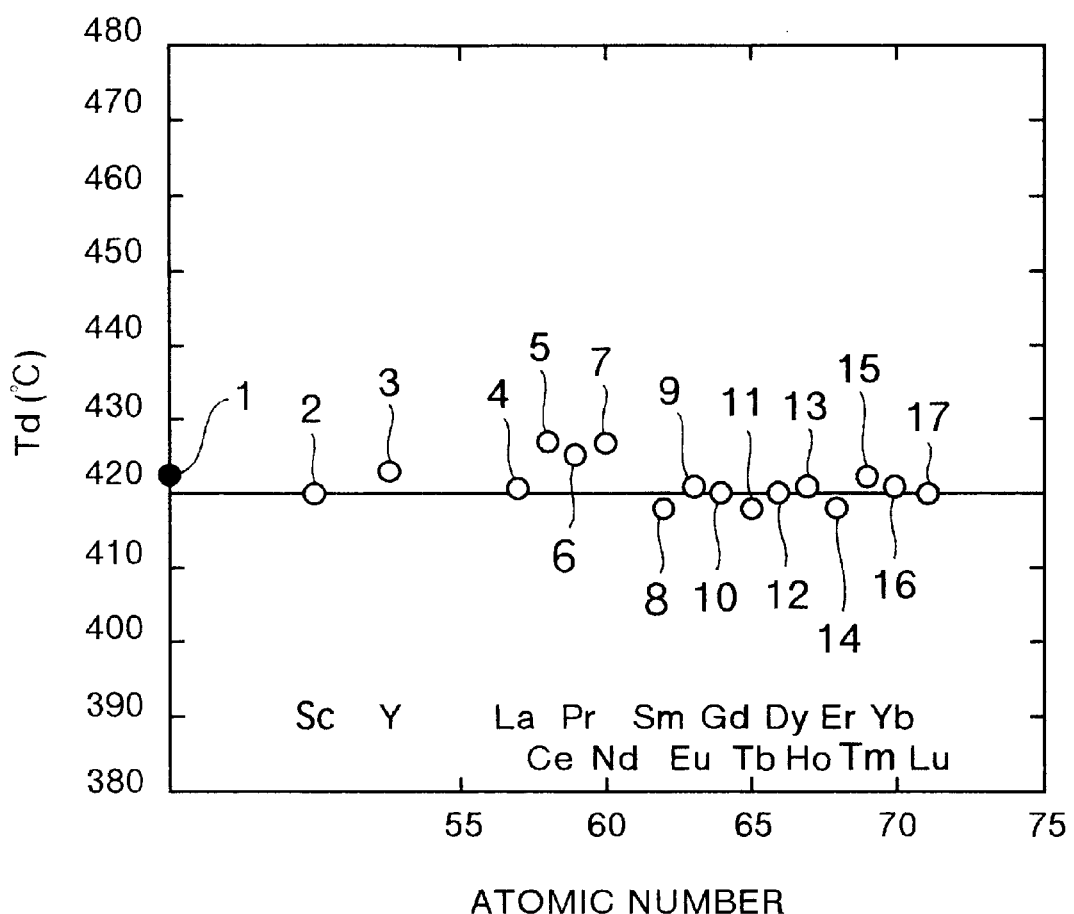
FIG. 1 is a graph which shows the relation between the atomic number of the rare earth elements contained in the glass and the deformation temperature of the glass.

In these drawings, the main reference numerals indicate the following.

1: Sealing glass; 2, 2': Materials to be bonded; 11, 11': Magnetic cores; 14, 14': Magnetic films; 15: Magnetic gap; 16: Sealing glass; 18, 18': Coils; 19: Fitting jig; 20: Terminal guiding hole; 21: Video head; 22; Cylinder; 26: Magnetic recording medium.

DETAILED DESCRIPTION OF THE INVENTION

The glass of the present invention is a glass containing at least one rare earth element and this glass comprises a matrix in which fine particles are uniformly dispersed, thereby to make it possible to improve sharply the mechanical strength with causing substantially no deterioration in flowability or deaeration of the glass. The glass can be used for a sealing glass and heat resistant parts such as a pannel glass for a cathode-ray tube, and the like. Said fine particles contain at least one of rare earth elements. As the rare earth elements, Pr, Nd, Sm, Eu, Gd, Tb, Dy, Ho, Er, Tm, Yb and Lu are effective. Furthermore, it is effective for the fine particles to have a particle size of 1–50 nm. If the particle size is smaller than 1 nm, the effect to improve mechanical strength is small and if it exceeds 50 nm, it is difficult to obtain satisfactory flowability or deaeration of the glass. The particle size is more preferably 3–10 nm to obtain further superior mechanical strength. Moreover, the mechanical strength can be effectively improved, when said matrix is composed of a glass containing a heavy metal oxide such as lead oxide and boron oxide and/or silicon oxide, which can perform the sealing at low temperatures.

The sealing glass of the present invention contains, in terms of the following oxides, PbO: 44–91% by weight, $B_2O_3$: at least 6% by weight, $SiO_2$: 0–30% by weight, the total content of $B_2O_3$ and $SiO_2$: 6–40% by weight, and $Ln_2O_3$ (Ln: Pr, Nd, Sm, Eu, Gd, Tb, Dy, Ho, Er, Tm, Yb and Lu): 0.3–2.9% by weight, and fine particles are uniformly dispersed-therein. Therefore, the resulting glass is excellent in flowability and deaeration and in mechanical strength.

When the PbO content is less than 44% by weight or exceeds 91% by weight, vitrification occurs with difficulty. When the content of $B_2O_3$ is less than 6% by weight, the fine particles containing rare earth elements cannot be uniformly dispersed in the glass. When the content of $SiO_2$ exceeds 30% by weight or the total content of $B_2O_3$ and $SiO_2$ is less than 6% by weight, the rare earth oxide powder added remain in the glass in the form of the powder. Moreover, when the total content of $B_2O_3$ and $SiO_2$ exceeds 40% by weight, the tendency of vitrification increases. When the content of $Ln_2O_3$ (Ln: Pr, Nd, Sm, Eu, Gd, Tb, Dy, Ho, Er, Tm, Yb and Lu) is less than 0.3% by weight, the effect to improve the mechanical strength is small and when it exceeds 2.9% by weight, the flowability and deaeration of the glass are unsatisfactory.

Moreover, when the content of PbO in the above ranges exceeds 77% by weight, the effect to improve the mechanical strength by adding the rare earth elements is small. Further, when the $B_2O_3$ content exceeds 20% by weight, also the effect to improve the mechanical strength is small. When ZnO and $Al_2O_3$ are contained, chemical stability and mechanical strength of the glass are further improved. When $R_2O$ (R: an alkali metal element) is added, the glass can be rendered low-melting. The alkali metal elements here include elements such as, for example, lithium, sodium, potassium, rubidium and cesium. However, if the total content of ZnO, $Al_2O_3$ and $R_2O$ exceeds 25% by weight, the glass is crystallized. Moreover, when the content of $Ln_2O_3$ (Ln: Pr, Nd, Sm, Eu, Gd, Tb, Dy, Ho, Er, Tm, Yb and Lu) is less than 0.5% by weight or exceeds 1.5% by weight, the effect to improve the mechanical strength is small.

Therefore, more preferably, the sealing glass contains, in terms of the following oxides, PbO: 44–77% by weight, $B_2O_3$: 6–20% by weight, $SiO_2$: 0–30% by weight, at least one of ZnO, $Al_2O_3$ and $R_2O$ (R: an alkali metal element): 0–25% by weight, and $Ln_2O_3$ (Ln: Pr, Nd, Sm, Eu, Gd, Tb, Dy, Ho, Er, Tm, Yb and Lu): 0.5–1.5% by weight.

Furthermore, according to the present invention, the apparent thermal expansion coefficient of the sealing glass can be reduced by uniformly dispersing in the matrix the low-expansion fillers such as, for example, zirconium silicate, lead titanate, β-eucryptite and silica glass, and, thus, the glass can be applied to the sealing of low-expansion materials.

The sealing glass of the present invention can be produced by a method including a step of heating a mixed powder of glass raw materials in a crucible to obtain a glass melt, a step of precipitating fine particles in the glass melt, a step of continuously stirring the glass melt by vibration generated by a vibrator provided in contact with outer wall of the crucible, a step of cooling the glass melt to obtain a glass, and a step of reheating the glass and annealing it.

Since the sealing glass of the present invention has good mechanical strength, flowability and deaeration, a structure sealed using this glass can be greatly improved in reliability. Therefore, the glass is very effective for structures such as a magnetic head.

Next, since the sealing glass of the present invention is excellent in flowability at low temperatures, magnetic films mainly composed of Fe which are low in heat resistance, but high in saturated magnetic flux density can be used, and as a result, magnetic heads excellent in both the reliability and the performance can be obtained. Especially, when the sealing glass has a micro Vickers hardness of 425 or more, yield in production of magnetic heads is high and strength of head chips is high, and magnetic heads of long life can be obtained even when the relative speed of the magnetic head and the magnetic recording medium is higher than 52 m/sec.

Furthermore, by using the sealing glass of the present invention, the sliding width of the magnetic head can be reduced to 65 μm or less, and as a result, improvement of performances due to improvement of tape touch and maintenance of reliability can be attained. Moreover, the sealing glass of the present invention makes it possible to bond only the gap parts of magnetic head and greatly simplify the coil winding step of magnetic heads.

Moreover, the magnetic recording and reproducing apparatus provided with the magnetic heads of the present invention can be markedly improved in performance and reliability. Further, the magnetic heads can be applied to magnetic recording and reproducing apparatuses of 20 m/sec or higher in the relative speed of the magnetic head and the magnetic recording medium, such as high-definition digital VCR.

From the points of proper thermal expansion coefficient and bonding temperature, in the bonding glass for magnetic heads, there may be used 55–70% of $V_2O_5$, 17–25% of $P_2O_5$, 3–20% of $Sb_2O_3$, 0–20% of PbO, 0–15% of $Tl_2O$ and 0–5% of $Nb_2O_5$ (by weight).

$SiO_2$ is mainly used as the non-magnetic gap material, and an $SiO_2$—$B_2O_3$ glass, an $SiO_2$—PbO glass and the like which have a bonding temperature in the range of 700–800° C. are used for bonding of the magnetic cores.

Magnetic films such as of Co-based amorphous alloys, sendust alloys and Fe-C materials having a saturated magnetic-flux density higher than that of ferrites are used for the magnetic cores as shown in Table 1. The saturated magnetic flux density of these magnetic films is higher than 8000 gausses, which is considerably higher than 4000–5000 gausses of ferrites. Therefore, high density recording much higher than that obtained by conventional magnetic heads can be obtained using the magnetic heads which use the above-mentioned magnetic films.

As shown in Table 2, the substrate is needed to have a micro Vickers hardness of at least 600 from the point of wear resistance of magnetic heads. Furthermore, since the substrate must have a thermal expansion coefficient adapted to that of the magnetic film to some extent, combinations of the substrate a-c shown in Table 2 with the magnetic film A shown in Table 1, the substrates e and f shown in Table 2 with the magnetic film B shown in Table 1, and the substrates c and d shown in Table 2 with the magnetic film C shown in Table 1 are preferred.

The present invention can be applied to extended definition digital VCR for business use, extended definition 6 mm digital VCR for public use, digital videocassettes for public use, analog 8 mm-VCR, S-VHS and W-VES-VCR.

TABLE 1

| | Magnetic film | Saturated magnetic flux density (tesla) | Thermal expansion coefficient ($\times 10^{-7}/°$ C.) | Resisting temperature (° C.) |
|---|---|---|---|---|
| A | Co-based amorphous alloy (Co—Nb—Zr) | 0.9 | 120 | 480 |
| B | Sendust alloy (Fe—Si—Al) | 1.0 | 150 | 620 |
| C | Fe—C material (Fe—C—Ta) | 1.5 | 130 | 620 |
| D | Single crystal Kn—Zn ferrite | 0.5 | 110 | 800 |

TABLE 2

| | Substrate | Thermal expansion coefficient ($\times 10^{-7}/°$ C.) | Micro Vickers hardness Hv |
|---|---|---|---|
| a | Single crystal Mn—Zn ferrite | 110 | 650 |
| b | α-Fe$_2$O$_3$ ceramics | 115 | 900 |
| c | NiO—CoO—TiO$_2$ ceramics | 120 | 650 |
| d | MgO—NiO ceramics | 130 | 800 |
| e | MnO—NiO ceramics | 135 | 600 |
| f | TiO$_2$—NiO—CaO ceramics | 140 | 850 |

DESCRIPTION OF THE PREFERRED EMBODIMENTS

EXAMPLE 1

Table 3 shows blending composition (% by weight) of the glass investigated in the present invention, kind of the added rare earth elements (Ln), glass transition temperature (Tg/° C.) and deformation temperature (Td: ° C.) measured from thermal expansion characteristics, and micro Vickers hardness (Hv: kgf-mm$^{-2}$) of the glass. It further shows the state of vitrification at the time of making the glass and the state of a structure made using this glass. Both the Tg and the Td can be obtained from a chart which shows the relation between elongation and temperature. Tg is shown by the point at which the elongation first abruptly increases and Td is shown by the point at which the elongation is saturated. The sample has 5 mm$\phi$ and the measurement is conducted under application of a load of 10 g.

The glass was produced in the following manner. Raw material powders in a given amount were weighed and charged in a platinum crucible and mixed therein, followed by melting the mixture at about 1000–1100° C. in an electric furnace. After the raw materials were sufficiently molten, the melt was stirred for about 1 hour by generating an ultrasonic in the melt by an ultrasonic generator provided at the hearth. Then, the glass melt was poured into a graphite mold heated at about 300° C. to make a glass block. The glass block was annealed at 5° C./min or less, preferably 1–2° C./min and processed to prepare various test pieces.

TABLE 3

| No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Composition % by weight | | | | | | | | | | | | | | | | | |
| PbO | 55 | 55 | 55 | 55 | 55 | 55 | 55 | 55 | 55 | 55 | 55 | 55 | 55 | 55 | 55 | 55 | 55 |
| SiO$_2$ | 20 | 20 | 20 | 20 | 20 | 20 | 20 | 20 | 20 | 20 | 20 | 20 | 20 | 20 | 20 | 20 | 20 |
| B$_2$O$_3$ | 8 | 8 | 8 | 8 | 8 | 8 | 8 | 8 | 8 | 8 | 8 | 8 | 8 | 8 | 8 | 8 | 8 |
| Al$_2$O$_3$ | 2 | 2 | 2 | 2 | 2 | 2 | 2 | 2 | 2 | 2 | 2 | 2 | 2 | 2 | 2 | 2 | 2 |
| ZnO | 7 | 6 | 6 | 6 | 6 | 6 | 6 | 6 | 6 | 6 | 6 | 6 | 6 | 6 | 6 | 6 | 6 |
| Na$_2$O | 8 | 8 | 8 | 8 | 8 | 8 | 8 | 8 | 8 | 8 | 8 | 8 | 8 | 8 | 8 | 8 | 8 |
| Ln$_2$O$_3$ | — | 1 | 1 | 1 | 1 | 1 | 1 | 1 | 1 | 1 | 1 | 1 | 1 | 1 | 1 | 1 | 1 |
| Ln | — | Sc | Y | La | Ce | Pr | Nd | Sm | Eu | Gd | Tb | Dy | Ho | Er | Tm | Yb | Lu |
| Tg (° C.) | 386 | 392 | 385 | 386 | 380 | 378 | 378 | 372 | 375 | 376 | 370 | 373 | 377 | 379 | 374 | 373 | 373 |
| Td (° C.) | 422 | 420 | 423 | 421 | 427 | 425 | 427 | 418 | 421 | 420 | 418 | 420 | 421 | 418 | 422 | 421 | 420 |
| Hv | 395 | 415 | 419 | 420 | 431 | 451 | 434 | 472 | 490 | 496 | 486 | 488 | 489 | 462 | 484 | 474 | 473 |
| Vitrification | ◯ | ◯ | ◯ | ◯ | X | ◯ | ◯ | ◯ | ◯ | ◯ | ◯ | ◯ | ◯ | ◯ | ◯ | ◯ | ◯ |
| Structure | ◯ | ◯ | ◯ | ◯ | Bubbles | ◯ | ◯ | ◯ | ◯ | ◯ | ◯ | ◯ | ◯ | ◯ | ◯ | ◯ | ◯ |

The thermal expansion characteristic was measured using a test piece of 5 mm$\phi$×30 mmH at a heating rate of 5° C./min in the air. A silica glass was used as a standard sample. The micro Vickers hardness was measured at ten portions under the conditions of a load of 100 g and a load application time of 15 seconds and the average value was employed as the micro Vickers hardness. In the column of vitrification in Table 3, "◯" means that the melt vitrified at the time of glass making and "x" means that the melt insufficiently vitrified or did not vitrify. With reference to the structure in Table 3, the structure illustrated in FIG. 7 was made and flowability, deaeration and transparency of the glass were evaluated and "◯" means that the results of evaluation were satisfactory and when the results were unsatisfactory, the cause therefor was mentioned.

Figure 7:
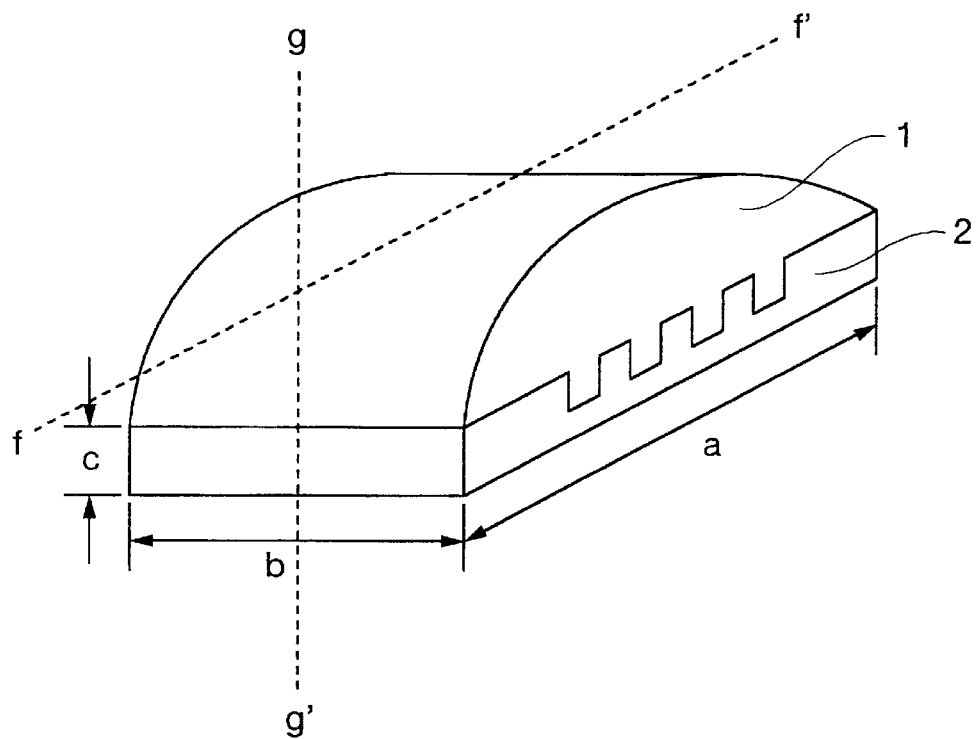
FIG. 7 is an oblique view of a structure of the present invention.
Figure 8:
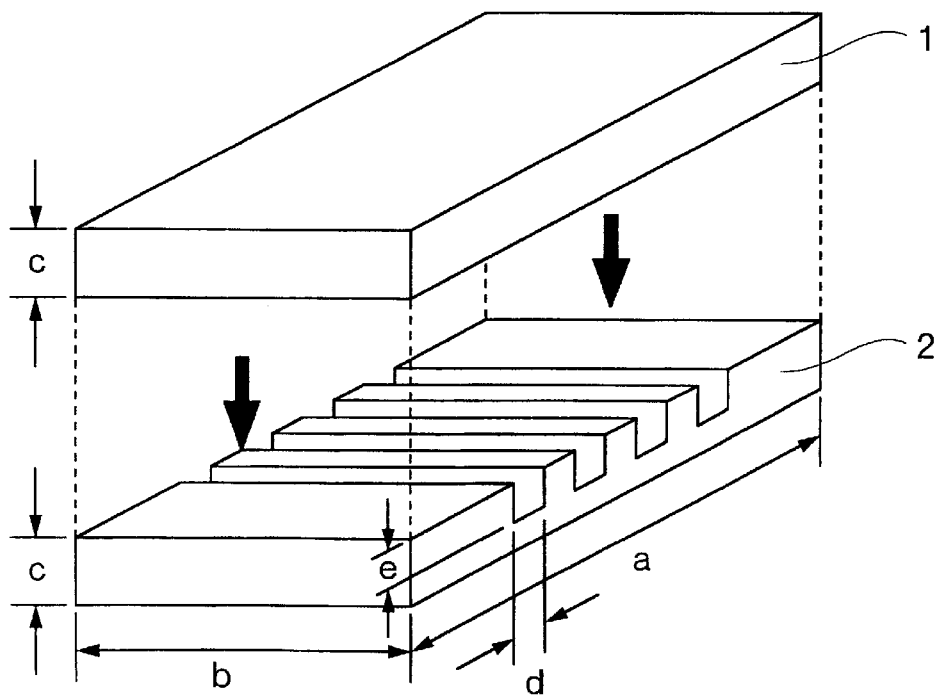
FIG. 8 shows the method for bonding the structure shown in FIG. 7.

FIG. 8 illustrates the method of making this structure. An Mn—Zn ferrite single crystal substrate of a=14 mm, b=7 mm and c=1 mm having many rectangular grooves of 0.3 mm in both the depth d and the width e which were cut in the direction of b was employed as a material 2 to be bonded. On the grooved surface of the material 2 as a base was placed a plate comprising sealing glass 1 having the same size as the base, followed by carrying out a heat treatment to obtain a structure as shown in FIG. 7. The heat treating conditions were 580° C. at which the viscosity of the glass reached $10^4$ poises and 30 minutes. The atmosphere was under vacuum.

The glass No.1 was a basic glass containing lead oxide, silicon oxide and boron oxide as main components and containing no rare earth element. The glass compositions of Nos.2–17 were determined by replacing 1% by weight of ZnO component of the glass No.1 with oxides of rare earth elements.

As for the glass of No. 5, the added Ce remained in the glass in the form of a powder and a uniform glass could not be made. Accordingly, the values shown in Table 3 were those obtained by carrying out the measurements on the glass in the state of the powder remaining. Other glasses were satisfactory without causing devitrification, etc. during making of the glass.

Figure 2:
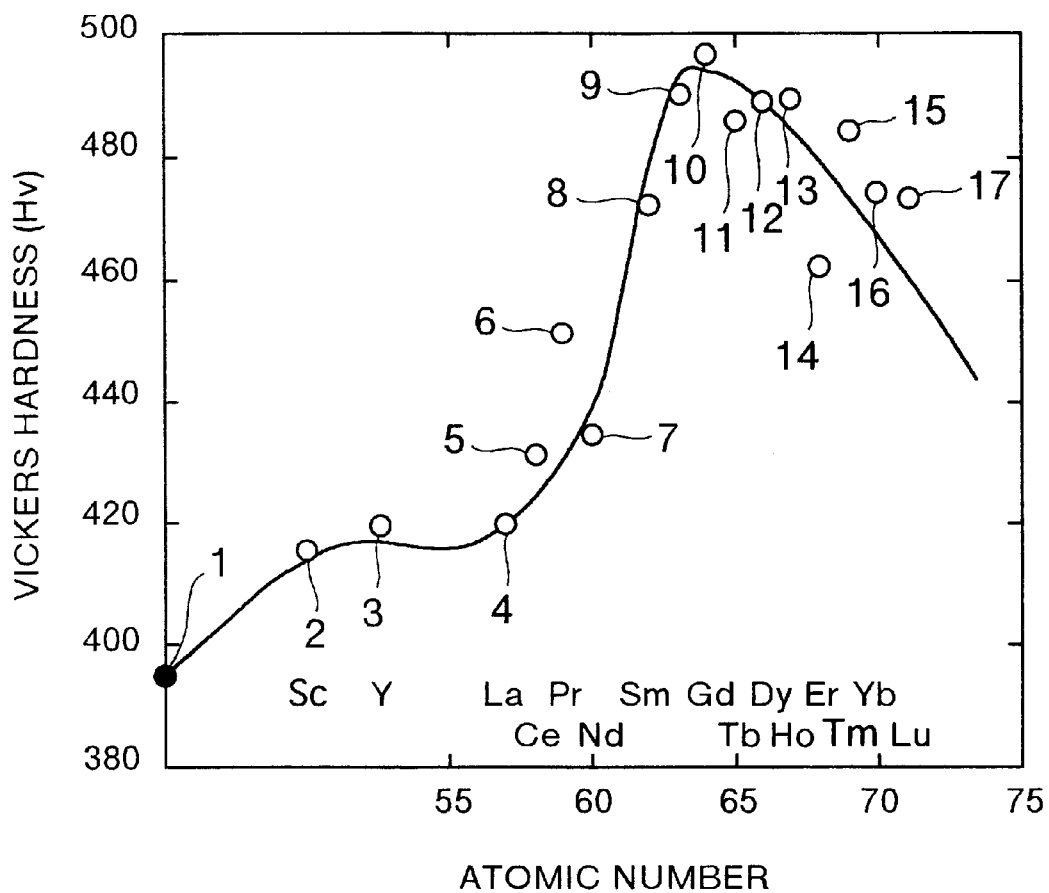
FIG. 2 is a graph which shows the relation between the atomic number of the rare earth elements contained in the glass and the micro Vickers hardness of the glass.

FIG. 1 and FIG. 2 show change of the deformation temperature and the micro Vickers hardness of each glass in respect to the atomic number of the rare earth elements contained in the glass shown in Table 3. As shown in FIG. 1, the deformation temperature of the glasses containing any rare earth elements was nearly the same as that of the glass No. 1, namely, it was about 420° C. and constant. Furthermore, it was found that as shown in FIG. 2, the micro Vickers hardness of all the glasses increased as compared with the glass No. 1 containing no rare earth element. Especially, in the case of the glasses of No.6 to No. 17 containing the rare earth elements of Pr and those larger in atomic number, the micro Vickers hardness was higher about 10–26% than that of the glass No. 1. Thus, it can be seen that only the micro Vickers hardness can be increased without increasing the characteristic temperature of the glass by adding rare earth elements.

Moreover, when glass was prepared under continuous stirring by ultrasonic as mentioned above, fluctuation in the micro Vickers hardness was small while when the glass was prepared without the continuous stirring, the micro Vickers hardness greatly fluctuated. Therefore, it is desirable to carry out the continuous stirring for obtaining sealing glass of high reliability.

Figure 9:
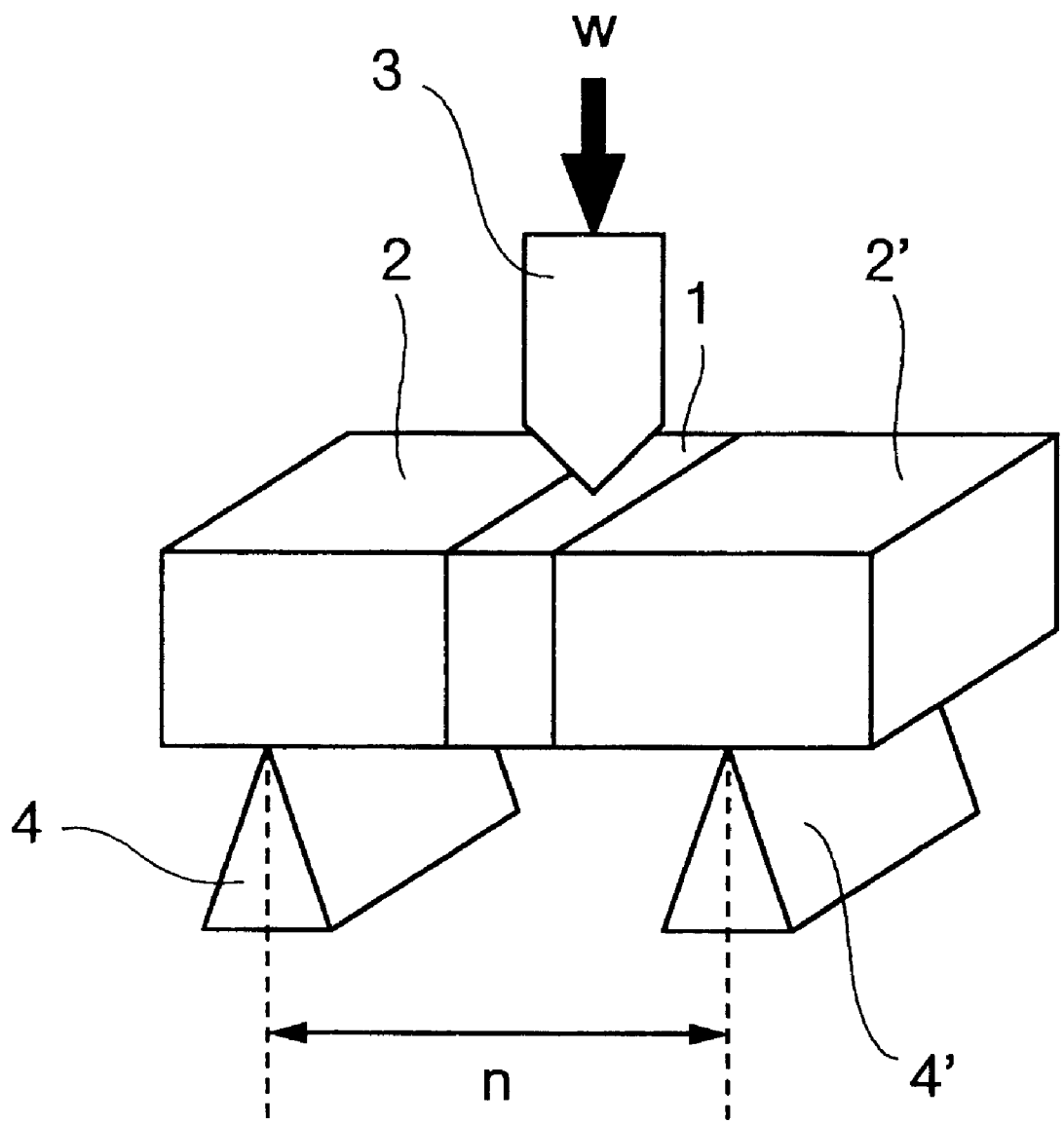
FIG. 9 shows the method for the measurement of the bond strength.

Next, the effect of improvement in mechanical strength was evaluated by the three-point bending test as shown in FIG. 9. As the samples, glass No.1 and glass No.14 containing 1.0% by weight of $Er_2O_3$ were used. Test pieces of 1 mm thick, 2 mm wide and 3 mm long were prepared from the glass blocks. The test piece was set in a measuring jig having an lower span of 1.2 mm and the three-point bending strength was measured. The measuring number n' was 16 for all samples. When the load applied is w (N), the three-point bending strength σ (MPa) is σ=(3nw/2lm²), wherein n is the lower span length, l is the width of the test piece and m is the thickness of the test piece.

The average value of the three-point strengths (σ/MPa) of each sample is shown in Table 4. The average three-point bending strength of the glass No.1 containing no rare earth element was 70 MPa while that of the glass No.14 containing Er was 102 MPa, which showed improvement of about 45%. Thus, not only the micro Vickers hardness, but also the three-point bending strength could be greatly improved by the addition of the oxides of rare earth elements.

TABLE 4

| No. | n' | σ(MPa) | Note |
| --- | --- | --- | --- |
| 1 | 16 | 70 | Comparative Example |
| 14 | 16 | 102 | Example |

Figure 10:
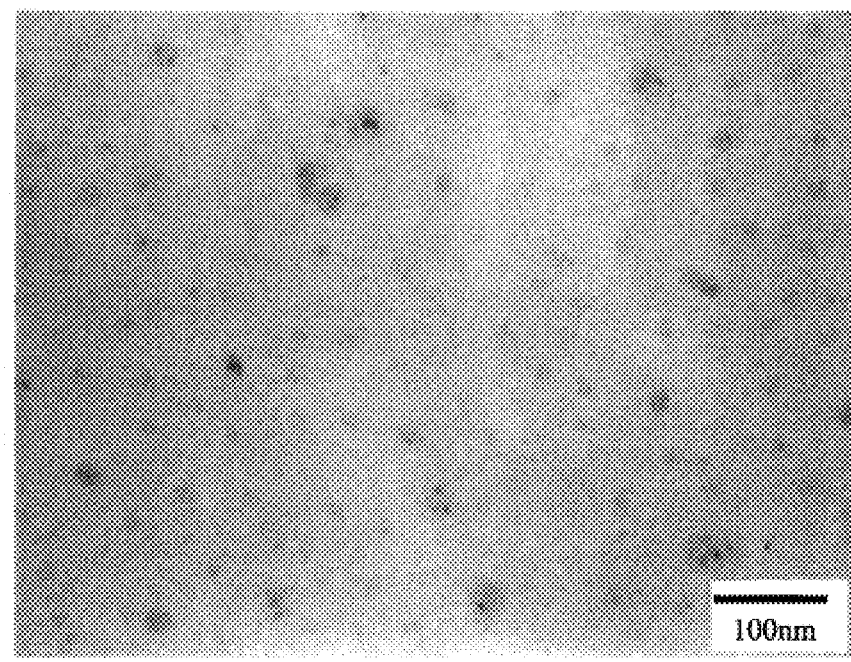
FIGS. 10 and 11 are photographs of the glass No. 14 taken by a transmission electron microscope.
Figure 11:
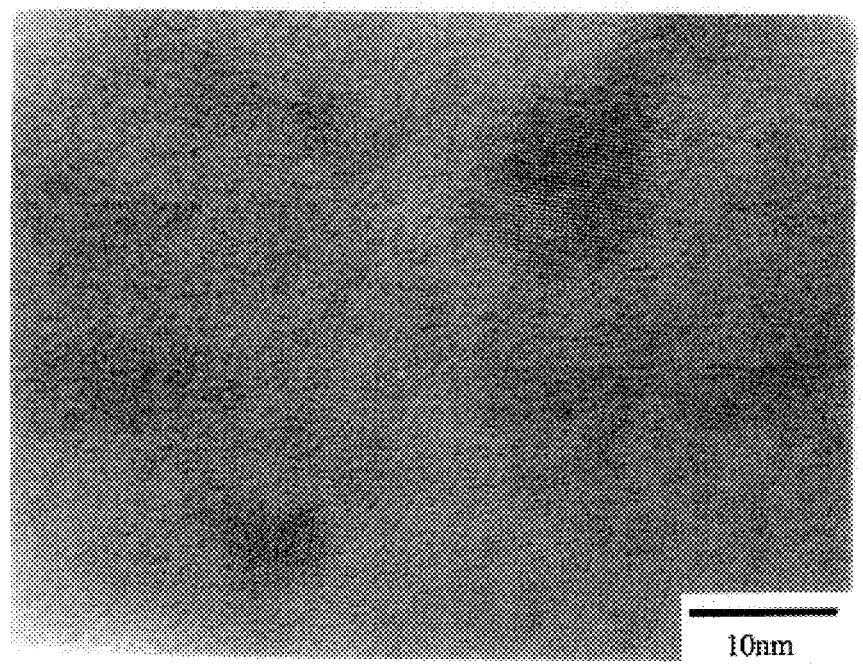

As explained above, the mechanical strength can be improved without increasing the characteristic temperature by adding rare earth elements. In order to elucidate the cause therefor, the difference in the inner structure of glasses due to the presence or absence of rare earth element was examined by a transmission electron microscope. The glass No. 14 containing $Er_2O_3$ and the glass No.1 containing no rare earth element were observed by a transmission type electron microscope to find that the glass No. 1 was wholly uniform amorphous substance while in the case of the glass No. 14, fine particles having a particle size of about 4.5 nm were seen in an amorphous matrix. FIG. 10 is a photograph of the glass No. 14C taken by a transmission electron microscope. Portions darker than the matrix are the particles containing the rare earth element. Point analysis by EDS showed that the particles contained Er in a large amount. According to observation under the higher magnification, a lattice image which shows that the particles are crystalline was observed. FIG. 11 is a photograph of the particles and the neighborhood thereof taken by a transmission electron microscope. In the particles, lattice patterns are observed, and hence the particles are crystalline. In contrast, no lattice pattern is observed in the neighborhood of the particles. Therefore, it is recognized that the neighborhood is amorphous, i.e., glassy. From this fact, it can be guessed that the fine particles are fine crystal grains produced with Er of $Er_2O_3$ as nuclei.

Moreover, it can be considered that since the particle size of $Er_2O_3$ raw material powder was about 1 μm, the $Er_2O_3$ powder was once dissolved in the glass melt and, thereafter, exceeded the saturation solubility by cooling of the melt and precipitated in the glass to result in formation and growth of nuclei to produce the fine particles mentioned above.

Furthermore, bonding species of the glass was identified by FT-IR and there was seen substantially no difference between the glass No.14 containing $Er_2O_3$ and the glass No.1 containing no $Er_2O_3$. From the above, it is considered that since the bond of glass does not change so much by the addition of rare earth elements, they do not affect so much the characteristic tempera- ture, but propagation of cracks was inhibited and the mechanical strength was improved due to the presence of fine particles in the order of several nanometers in the glass.

As mentioned above, glasses which contain at least one of rare earth elements and in which fine particles are uniformly dispersed can be improved in their mechanical strength without increasing the characteristic temperature. In addition, the above rare earth elements are present much in the fine particles and are essential components for producing the particles. Therefore, when the rare earth element added is contained in the fine particles, the fine particles can be more uniformly contained in the glass.

Among the rare earth elements, Ce also improves the mechanical strength of the glass without increasing the characteristic temperature, but since Ce powder remains in the glass as it is, this is not preferred. It is considered that this is because other rare earth ions are trivalent while Ce is tetravalent and stable and, hence, Ce oxide differs from other rare earth oxides in solubility in glass.

The structure of FIG. 7 was further produced. In the case of glass No.5, the powder remained in the glass and, hence, deaeration was not satisfactory. Other glasses were superior in flowability, deaeration and transparency of the glass. Therefore, these glasses can be also used for structures which are required to have transparency of glass, such as magnetic head and others.

Sc, Y and La were small in increasing rate. Pm is present only as a radioactive isotope and is difficult to put to practical use. From the above, it is preferred to use Pr, Nd, Sm, Eu, Gd, Tb, Dy, Ho, Er, Tm, Yb and Lu.

EXAMPLE 2

Next, various characteristics of glass in relation with contents of the oxides of rare earth elements examined in Example 1 are investigated in this Example. In this Example, three kinds of oxides containing Pr, Nd and Er are investigated. Method of preparation of glass and evaluation method are the same as in Example 1.

As shown in the column of "vitrification" in Table 5, when 4.0% by weight of the oxide of the rare earth element was contained (Nos. 6F, 7F and 14F), no vitrification occurred. When the oxide was contained in an amount of 3% by weight or more (Nos. 6E, 6F, 7E, 7F, 14E and 14F), the flowability and the deaeration of the glass were unsatisfactory at the time of making the structure. When the content was 2.9% by weight (Nos. 6D, 7D and 14D), the flowability of the glass was satisfactory and bubbles were hardly generated. Thus, when the oxide of the rare earth element is contained in an amount of more than 2.9% by weight, the flowability and the deaeration of the glass are damaged due to increase in the tendency of crystallization and the resulting glass is not preferred as a sealing glass.

Figure 3:
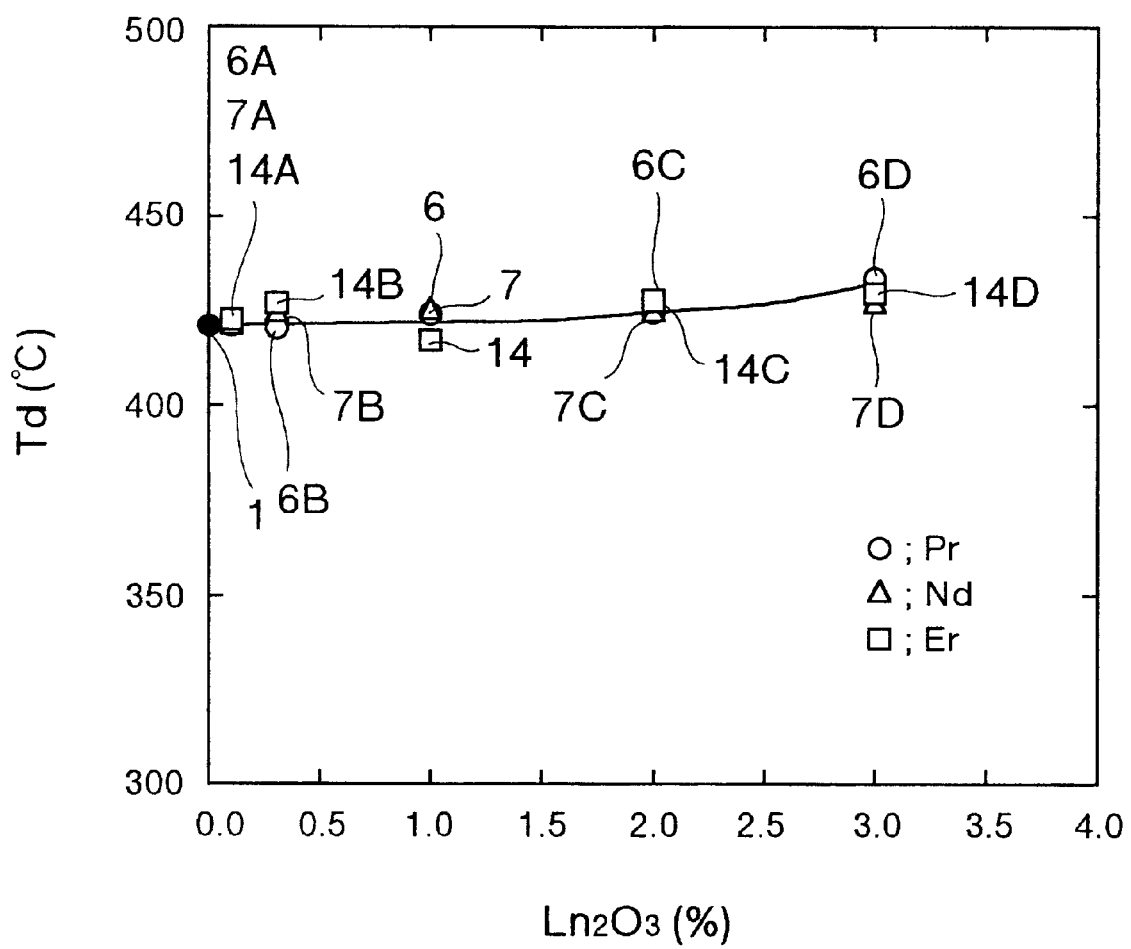
FIG. 3 is a graph which shows the relation between the content of the rare earth oxides and the deformation temperature of the glass.
Figure 4:
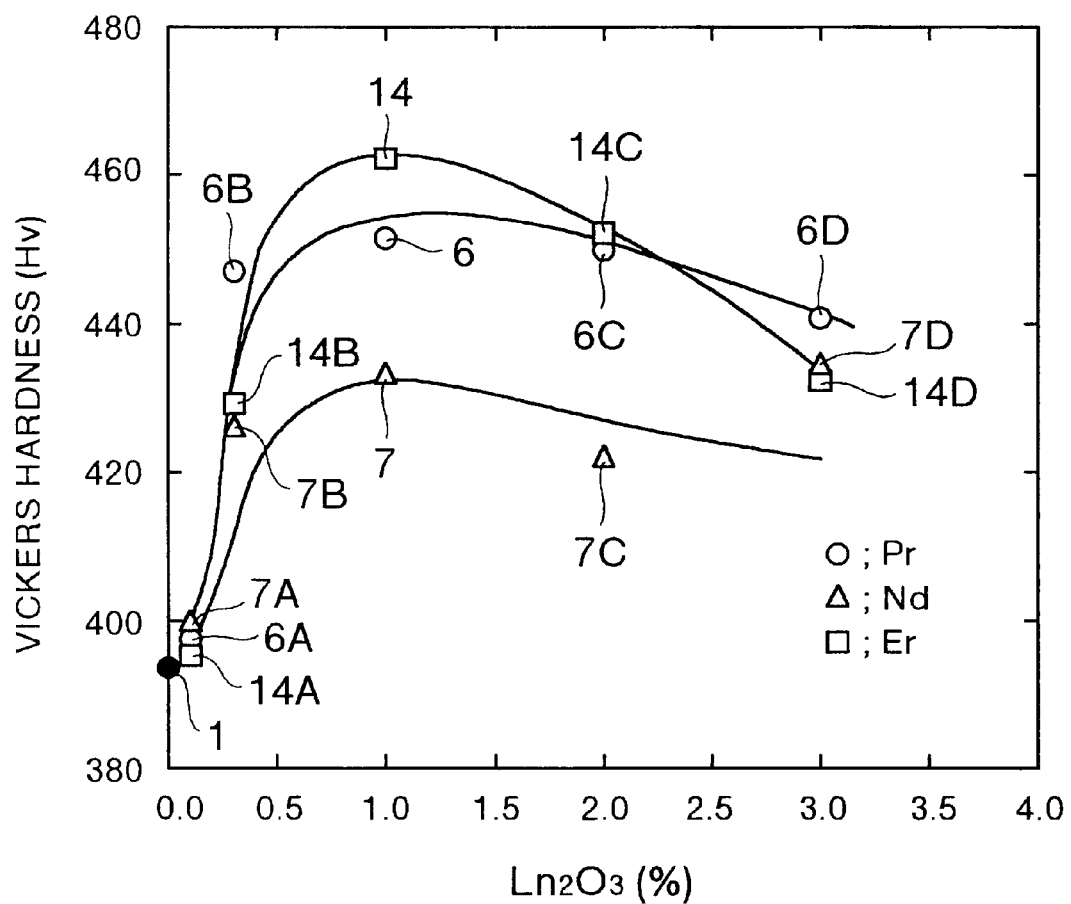
FIG. 4 is a graph which shows the relation between the content of the rare earth oxides and the micro Vickers hardness of the glass.

FIG. 3 shows the relation between deformation temperature and content of the oxide of rare earth element in the glasses A–D which gave good results in preparation of the glass and in making the structure in Table 5, and FIG. 4 shows the relation between the micro Vickers hardness and the content. In FIG. 3 and FIG. 4, ○, Δ and □ show the characteristics of glasses containing Pr, Nd and Er, respectively. ● is a plot of the glass No.1 containing no lanthanide element.

As shown in FIG. 3, the deformation temperature was about 420° C. and showed substantially no change with change of the content of the element. Moreover, as shown in FIG. 4, the micro Vickers hardness was maximum when content of the oxide of every element was 1.0% by weight (Nos. 6, 7 and 14). When the content exceeded 1.0% by weight, the micro Vickers hardness was about 440, which was higher than that of the glass No. 1, but the hardness decreased with increase of the content. Further, for all of the elements, when the content of the oxide was 0.3% by weight, the micro Vickers hardness sharply increased to higher than 420, but when it was 0.1% by weight (Nos. 6A, 7A and 14A), the hardness was about 400 and, thus, the effect of the addition was small.

Figure 5:
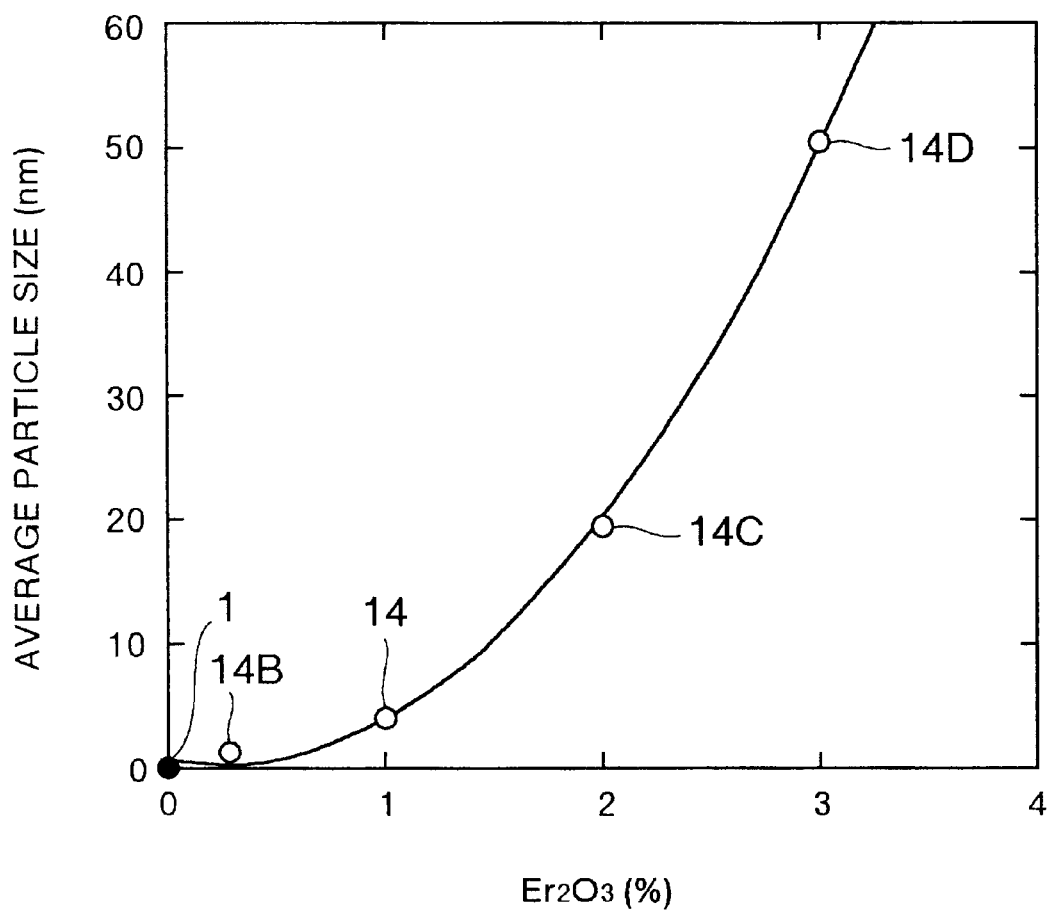
FIG. 5 is a graph which shows the relation between the content of the rare earth oxides and the particle size of fine particles present in the glass.

In order to elucidate the causes therefor, glasses changed in the content of the rare earth elements were observed by a transmission type electron microscope to examine the relation between the content of the rare earth element and the particle size of the precipitated fine particles. FIG. 5 shows the relation between the amount of Er oxide when Er was contained as the rare earth element and the particle size of the fine particles. The particle size of the precipitated particles increased with increase in the amount of the Er oxide added, and when the amount was 2.0% by weight, the particle size was about 20 nm and when 2.9% by weight, it was about 50 nm. In this case, the flowability of the glass was not damaged. When the amount was 3.0% by weight, the particle size was more than 50 nm. When the particles size reached such degree, the flowability of the glass was damaged. Therefore, when the particle size of the fine particles present in the glass is 50 nm or less, the flowability of the glass is not damaged and this glass is effective as a sealing glass.

Figure 6:
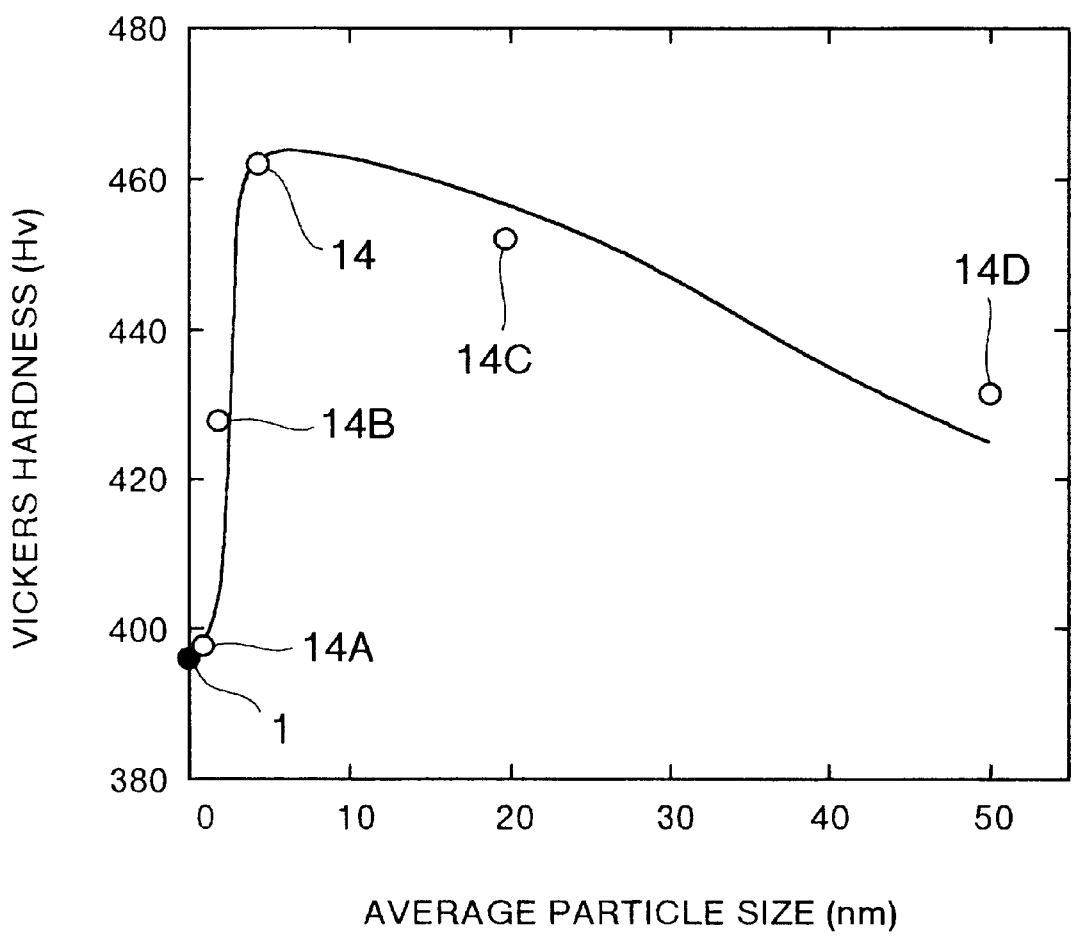
FIG. 6 is a graph which shows the relation between the particle size of fine particles and the micro Vickers hardness.

Furthermore, when the content of the Er oxide was 0.3% by weight, the particle size was 1 nm and when 0.1% by weight, the particle size was less than 1 nm. FIG. 6 shows the relation between the particle size and the micro Vickers hardness. As in FIG. 6, when the particle size was 1 nm, the micro Vickers hardness was improved, but when the particle size was less than 1 nm, the micro Vickers hardness showed substantially no change. Moreover, when the particle size was about 3 nm to 10 nm, the micro Vickers hardness could be increased to about 460. When the particle size was less than 3 nm and more than 10 nm, the increase of the micro Vickers hardness was small.

From the above, when the particle size of the precipitated fine particles is 1–50 nm, the micro Vickers hardness of glass is improved and the flowability of the glass is not damaged, and, thus, a satisfactory glass can be obtained. That is, when particle size of the fine particles is less than 1 nm, improvement of the micro Vickers hardness is small, and when it

TABLE 5

| No. | 6A | 6B | 6C | 6D | 6E | 6F | 7A | 7B | 7C | 7D | 7E | 7F | 14A | 14B | 14C | 14D | 14E | 14F |
|---|---|---|---|---|---|---|---|---|---|---|---|---|---|---|---|---|---|---|
| Composition % by weight | | | | | | | | | | | | | | | | | | |
| PbO | 55 | 55 | 55 | 55 | 55 | 55 | 55 | 55 | 55 | 55 | 55 | 55 | 55 | 55 | 55 | 55 | 55 | 55 |
| $SiO_2$ | 20 | 20 | 20 | 20 | 20 | 20 | 20 | 20 | 20 | 20 | 20 | 20 | 20 | 20 | 20 | 20 | 20 | 20 |
| $B_2O_3$ | 8 | 8 | 8 | 8 | 8 | 8 | 8 | 8 | 8 | 8 | 8 | 8 | 8 | 8 | 8 | 8 | 8 | 8 |
| $Al_2O_3$ | 2 | 2 | 2 | 2 | 2 | 2 | 2 | 2 | 2 | 2 | 2 | 2 | 2 | 2 | 2 | 2 | 2 | 2 |
| ZnO | 6.9 | 6.7 | 5 | 4.1 | 4 | 3 | 6.9 | 6.7 | 5 | 4.1 | 4 | 3 | 6.9 | 6.7 | 5 | 4.1 | 4 | 3 |
| $Na_2O$ | 8 | 8 | 8 | 8 | 8 | 8 | 8 | 8 | 8 | 8 | 8 | 8 | 8 | 8 | 8 | 8 | 8 | 8 |
| $Ln_2O_3$ | 0.1 | 0.3 | 2 | 2.9 | 3 | 4 | 0.1 | 0.3 | 2 | 2.9 | 3 | 4 | 0.1 | 0.3 | 2 | 2.9 | 3 | 4 |
| Ln | Pr | Pr | Pr | Pr | Pr | Pr | Nd | Nd | Nd | Nd | Nd | Nd | Er | Er | Er | Er | Er | Er |
| Tg (° C.) | 380 | 378 | 378 | 385 | 387 | — | 383 | 378 | 378 | 383 | 385 | — | 380 | 377 | 380 | 380 | 382 | — |
| Td (° C.) | 422 | 422 | 425 | 433 | 435 | — | 423 | 427 | 422 | 428 | 430 | — | 424 | 428 | 428 | 429 | 431 | — |
| Hv | 399 | 447 | 450 | 441 | 443 | — | 401 | 427 | 423 | 435 | 437 | — | 397 | 430 | 452 | 433 | 435 | — |
| Vitrification | ○ | ○ | ○ | ○ | ○ | X | ○ | ○ | ○ | ○ | ○ | X | ○ | ○ | ○ | ○ | ○ | X |
| Structure | ○ | ○ | ○ | ○ | Bubbles | | ○ | ○ | ○ | ○ | Bubbles | | ○ | ○ | ○ | ○ | Bubbles | | exceeds 50 nm, flowability of the glass decreases and deaeartion is also inferior. Further, when the particle size of fine particles is 3–10 nm, the increase of micro Vickers hardness is great.

From the viewpoint of the content of oxides of the rare earth elements, when it exceeds 2.9% by weight, flowability and deaeration of the glass are both inferior. When it is less than 0.3% by weight, the increase of micro Vickers hardness is small. Therefore, content of the oxides of the rare earth elements, is preferably 0.3–2.9% by weight. More preferably, when it is 0.5–1.5% by weight, the increase of micro Vickers hardness is great.

In the above, boron oxide and silicon oxide were used as oxides for forming network of glass, but in addition, glasses containing phosphorus oxide or fluorine can be considered to be components of low-temperature bonding glass. When glass was prepared using them as components, a glass containing rare earth element was obtained, but no improvement in mechanical strength resulting from addition of the rare earth elements was seen. It is considered that this is because the solubility of the rare earth elements in the glass is high and no crystallites having the rare earth elements as nuclei are produced. From this fact, it is preferred to use boron oxide and/or silicon oxide as the network-forming oxides for glass.

Furthermore, the structures made in this Example were very high in reliability because they were sealed using the glass of the present invention which had a high strength and contained few bubbles.

EXAMPLE 3

In this Example, investigation was made on the compositional ranges of the respective components of a glass which could be stably obtained and improved in mechanical strength by containing oxides of rare earth elements.

Tables 6–9 show the blending compositions (% by weight), state of vitrification, transparency, quality of the resulting structures, glass transition temperature (Tg/° C.) and deformation temperature (Td/° C.) obtained from thermal expansion characteristics, and micro Vickers hardness (Hv) of the investigated glasses. In Tables 6 and 7, the glasses of Nos. 22–50 corresponded to those of Nos. 51–82 shown in Tables 8 and 9 containing heavy metal oxides such as PbO, $Bi_2O_3$, etc., to which 1.0% by weight of $Er_2O_3$ was additionally contained.

TABLE 6

| No. | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|
| Composition % by weight | | | | | | | | | | | | | | | |
| PbO | 83 | 78 | 52 | 40 | 65 | 34 | 69 | 55 | 91 | 56 | 90 | 84 | 55 | 44 | 77 |
| $SiO_2$ | 4 | 4 | 20 | 20 | 12 | 12 | 9 | 8 | 2 | 30 | 1 | 3 | 5 | 26 | 4 |
| $B_2O_3$ | 12 | 12 | 6 | 8 | 7 | 8 | 13 | 22 | 6 | 10 | 6 | 7 | 14 | 8 | 13 |
| $Al_2O_3$ | — | 4 | 2 | 2 | 4 | — | 5 | 2 | — | 1 | — | 3 | 6 | 3 | 4 |
| ZnO | — | 1 | 9 | 6 | — | — | — | 6 | — | — | 2 | 3 | 8 | 8 | 1 |
| $Na_2O$ | — | — | 5 | 8 | 1 | — | 2 | 6 | — | 2 | — | 3 | 5 | 6 | — |
| $K_2O$ | — | — | 5 | — | — | — | — | — | — | — | — | — | 6 | 4 | — |
| $Bi_2O_3$ | — | — | — | 15 | — | 45 | — | — | — | — | — | — | — | — | — |
| $TeO_2$ | — | — | — | — | 10 | — | — | — | — | — | — | — | — | — | — |
| $Fe_2O_3$ | — | — | — | — | — | — | 1 | — | — | — | — | — | — | — | — |
| $Er_2O_3$ | 1 | 1 | 1 | 1 | 1 | 1 | 1 | 1 | 1 | 1 | 1 | 1 | 1 | 1 | 1 |
| Vitrification | ○ | ○ | ○ | ○ | ○ | ○ | ○ | ○ | ○ | ○ | ○ | ○ | ○ | ○ | ○ |
| Transparency | ○ | ○ | ○ | X | ○ | X | X | ○ | ○ | ○ | ○ | ○ | ○ | ○ | ○ |
| Structure | ○ | ○ | ○ | ○ | Bubbles | ○ | ○ | ○ | ○ | ○ | ○ | ○ | ○ | ○ | ○ |
| Tg (° C.) | 330 | 352 | 370 | 372 | 387 | 413 | 388 | 367 | 302 | 405 | 295 | 341 | 354 | 480 | 360 |
| Td (° C.) | 369 | 391 | 417 | 426 | 425 | 436 | 425 | 401 | 340 | 508 | 333 | 372 | 402 | 530 | 402 |
| HV | 340 | 365 | 440 | 465 | 426 | 481 | 430 | 379 | 322 | 516 | 302 | 342 | 405 | 548 | 403 |

TABLE 7

| No. | 37 | 38 | 39 | 40 | 41 | 42 | 43 | 44 | 45 | 46 | 47 | 48 | 49 | 50 |
|---|---|---|---|---|---|---|---|---|---|---|---|---|---|---|
| Composition % by weight | | | | | | | | | | | | | | |
| PbO | 55 | 50 | 65 | 50 | 50 | 51 | 92 | 60 | 59 | 69 | 45 | 45 | 43 | 71 |
| $SiO_2$ | 10 | 25 | 12 | 26 | 16 | 15 | 1 | 32 | 28 | 25 | 17 | 17 | 27 | 21 |
| $B_2O_3$ | 20 | 9 | 8 | 8 | 19 | 19 | 6 | 7 | 13 | 5 | 7 | 7 | 8 | 4 |
| $Al_2O_3$ | 2 | 3 | 5 | 2 | 2 | 2 | — | — | — | — | 8 | 8 | 3 | — |
| ZnO | 6 | 3 | 5 | 8 | 8 | 8 | — | — | — | — | 10 | 10 | 8 | — |
| $Na_2O$ | 6 | 9 | 4 | 5 | 4 | 4 | — | — | — | — | 12 | 6 | 6 | 3 |
| $K_2O$ | — | — | — | — | — | — | — | — | — | — | — | 6 | 4 | — |
| $Bi_2O_3$ | — | — | — | — | — | — | — | — | — | — | — | — | — | — |
| $TeO_2$ | — | — | — | — | — | — | — | — | — | — | — | — | — | — |
| $Fe_2O_3$ | — | — | — | — | — | — | — | — | — | — | — | — | — | — |
| $Er_2O_3$ | 1 | 1 | 1 | 1 | 1 | 1 | 1 | 1 | 1 | 1 | 1 | 1 | 1 | 1 |
| Vitrification | ○ | ○ | ○ | ○ | ○ | ○ | X | X | X | X | X | X | X | X |
| Trans- | ○ | ○ | ○ | ○ | ○ | ○ | X | X | X | X | X | X | X | X |

TABLE 7-continued

| No. | 37 | 38 | 39 | 40 | 41 | 42 | 43 | 44 | 45 | 46 | 47 | 48 | 49 | 50 |
|---|---|---|---|---|---|---|---|---|---|---|---|---|---|---|
| parency | | | | | | | | | | | | | | |
| Structure | ○ | ○ | ○ | ○ | ○ | ○ | X | X | X | X | X | X | X | X |
| Tg (° C.) | 372 | 415 | 384 | 471 | 440 | 432 | — | — | — | — | — | — | — | — |
| Td (° C.) | 411 | 468 | 422 | 501 | 486 | 474 | — | — | — | — | — | — | — | — |
| Hv | 443 | 512 | 425 | 526 | 502 | 480 | — | — | — | — | — | — | — | — |

TABLE 8

| No. | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|
| Composition % by weight | | | | | | | | | | | | | | | |
| PbO | 84 | 78 | 52 | 40 | 66 | 35 | 70 | 56 | 92 | 57 | 90 | 84 | 55 | 44 | 77 |
| $SiO_2$ | 4 | 4 | 20 | 20 | 12 | 12 | 9 | 8 | 2 | 30 | 1 | 1 | 5 | 26 | 4 |
| $B_2O_3$ | 12 | 12 | 6 | 8 | 7 | 8 | 13 | 22 | 6 | 10 | 6 | 5 | 14 | 8 | 13 |
| $Al_2O_3$ | — | 4 | 2 | 2 | 4 | — | 5 | 2 | — | 1 | — | 3 | 6 | 3 | 4 |
| ZnO | — | 2 | 10 | 7 | — | — | — | 6 | — | — | 3 | 4 | 9 | 9 | 2 |
| $Na_2O$ | — | — | 5 | 8 | 1 | — | 2 | 6 | — | 2 | — | 3 | 5 | 6 | — |
| $K_2O$ | — | — | 5 | — | — | — | — | — | — | — | — | — | 6 | 4 | — |
| $Bi_2O_3$ | — | — | — | 15 | — | 45 | — | — | — | — | — | — | — | — | — |
| $TeO_2$ | — | — | — | — | 10 | — | — | — | — | — | — | — | — | — | — |
| $Fe_2O_3$ | — | — | — | — | — | — | 1 | — | — | — | — | — | — | — | — |
| $Er_2O_3$ | — | — | — | — | — | — | — | — | — | — | — | — | — | — | — |
| Vitrification | ○ | ○ | ○ | ○ | ○ | ○ | ○ | ○ | ○ | ○ | ○ | ○ | ○ | ○ | ○ |
| Transparency | ○ | ○ | ○ | X | ○ | X | X | ○ | ○ | ○ | ○ | ○ | ○ | ○ | ○ |
| Structure | ○ | ○ | ○ | ○ | Bubbles | ○ | ○ | ○ | ○ | ○ | ○ | ○ | ○ | ○ | ○ |
| Tg (° C.) | 328 | 351 | 370 | 372 | 385 | 412 | 389 | 365 | 306 | 402 | 293 | 340 | 352 | 480 | 360 |
| Td (° C.) | 367 | 390 | 417 | 423 | 427 | 440 | 427 | 398 | 343 | 510 | 330 | 373 | 400 | 530 | 402 |
| Hv | 330 | 338 | 381 | 401 | 381 | 420 | 401 | 362 | 296 | 435 | 275 | 332 | 370 | 514 | 351 |

TABLE 9

| No. | 66 | 67 | 68 | 69 | 70 | 71 | 72 | 73 | 74 | 75 | 76 | 77 | 78 | 79 | 80 | 81 | 82 |
|---|---|---|---|---|---|---|---|---|---|---|---|---|---|---|---|---|---|
| Composition % by weight | | | | | | | | | | | | | | | | | |
| PbO | 55 | 50 | 65 | 50 | 50 | 51 | 93 | 53 | 60 | 70 | 45 | 45 | 43 | 72 | 61 | 62 | 55 |
| $SiO_2$ | 10 | 25 | 12 | 26 | 16 | 15 | 1 | 32 | 28 | 25 | 17 | 17 | 27 | 21 | 3 | 3 | 5 |
| $B_2O_3$ | 20 | 9 | 8 | 8 | 19 | 19 | 6 | 15 | 12 | 5 | 7 | 7 | 8 | 4 | 11 | 11 | 12 |
| $Al_2O_3$ | 2 | 3 | 5 | 2 | 2 | 2 | — | — | — | — | 8 | 8 | 3 | — | 7 | 5 | 7 |
| ZnO | 7 | 4 | 6 | 9 | 9 | 9 | — | — | — | — | 11 | 11 | 9 | — | 11 | 9 | 8 |
| $Na_2O$ | 6 | 9 | 4 | 5 | 4 | 4 | — | — | — | — | 12 | 6 | 6 | 3 | 4 | 3 | 8 |
| $K_2O$ | — | — | — | — | — | — | — | — | — | — | — | 6 | 4 | — | — | — | 4 |
| $Bi_2O_3$ | — | — | — | — | — | — | — | — | — | — | — | — | — | — | — | — | — |
| $TeO_2$ | — | — | — | — | — | — | — | — | — | — | — | — | — | — | — | — | — |
| $Fe_2O_3$ | — | — | — | — | — | — | — | — | — | — | — | — | — | — | — | — | — |
| $Er_2O_3$ | — | — | — | — | — | — | — | — | — | — | — | — | — | — | — | — | — |
| SrO | — | — | — | — | — | — | — | — | — | — | — | — | — | — | 3 | — | — |
| BaO | — | — | — | — | — | — | — | — | — | — | — | — | — | — | — | 7 | — |
| $TiO_2$ | — | — | — | — | — | — | — | — | — | — | — | — | — | — | — | — | 1 |
| Vitrification | ○ | ○ | ○ | ○ | ○ | ○ | ○ | ○ | ○ | ○ | ○ | ○ | ○ | ○ | X | X | X |
| Transparency | ○ | ○ | ○ | ○ | ○ | ○ | ○ | ○ | ○ | ○ | ○ | ○ | ○ | ○ | X | X | X |
| Structure | ○ | ○ | ○ | ○ | ○ | ○ | ○ | ○ | ○ | ○ | ○ | ○ | ○ | ○ | | Bubbles | |
| Tg (° C.) | 375 | 413 | 384 | 475 | 440 | 432 | 298 | 475 | 460 | 410 | 420 | 415 | 468 | 385 | 342 | 332 | 335 |
| Td (° C.) | 412 | 468 | 422 | 509 | 486 | 474 | 335 | 519 | 481 | 432 | 442 | 439 | 506 | 419 | 367 | 357 | 365 |
| Hv | 375 | 450 | 396 | 462 | 410 | 421 | 280 | 422 | 462 | 416 | 420 | 418 | 430 | 352 | 420 | 400 | 420 |

In Tables 6–9, the respective evaluations were conducted in the same manner as in Example 1. The heat treating temperature in making the structures was a temperature at which viscosity of the glass reached 104 poises and they were kept at that temperature for 30 minutes. The atmosphere was under vacuum. The transparency was evaluated by examining light transmission for visible light of a test piece of about 10 mm thick cut out from the glass block.

As shown in Tables 8–9, the glasses of Nos. 51–79 containing no oxides of rare earth elements all vitrified.

No. 35 in Table 6 containing 44% by weight of PbO vitrified, but No. 49 in Table 7 containing 43% by weight of PbO did not vitrify. No. 43 in Table 7 containing 92% by weight of PbO did not vitrify, but No. 30 containing 91% by weight of PbO and No. 32 containing 90% by weight of PbO in Table 6 vitrified. Therefore, content of PbO is preferably 44–91% by weight.

As for Nos.46 and 50 in Table 7, since the content of $B_2O_3$ was 5% by weight and 4% by weight, $Er_2O_3$ powder added remained in the form of the powder in the glass and could not be uniformly dispersed in the glass structure. In Nos. 24, 30 and 32 in Table 6, the content of $B_2O_3$ was 6% by weight, but the $Er_2O_3$ powder was uniformly dissolved in the glass. Therefore, the content of $B_2O_3$ is preferably 6% by weight or more.

In No. 44 in Table 7, the content of $SiO_2$ was 32% by weight, but $Er_2O_3$ powder remained in the glass and could not be uniformly dispersed in the glass structure. In No.31 in Table 6, since the content of $SiO_2$ was 30% by weight, the $Er_2O_3$ powder could be uniformly dispersed. Therefore, the content of $SiO_2$ is preferably 30% by weight or less.

In No. 45 in Table 7, the content of $SiO_2$ was less than 30% by weight and the content of $B_2O_3$ was 6% by weight or more, but since the total content of $SiO_2$ and $B_2O_3$ was 41% by weight, the sample was outside the vitrification region and did not vitrify. On the other hand, in No. 31 in Table 6, since the total content of $SiO_2$ and $B_2O_3$ was 40% by weight, it was within the vitrification region and vitrified. When the total content of $SiO_2$ and $B_2O_3$ is less than 6% by weight, the added $Er_2O_3$ powders remained as they were in the glass and this is not preferred. Therefore, it is preferred that the total content of $SiO_2$ and $B_2O_3$ is 6–40% by weight.

Next, when attention is given to the micro Vickers hardness of the glass, among the above glasses, those which vitrified all increased in the micro Vickers hardness. No. 22 and No. 23 in Table 6 had the PbO contents of 83% by weight and 78% by weight, respectively and were small in the degree of increase of the micro Vickers hardness. On the other hand, No. 36 in Table 6 had the PbO content of 77% by weight, but greatly increased in the micro Vickers hardness. Accordingly, the PbO content is preferably 77% by weight or less.

No. 29 in Table 6 contained 22% by weight of $B_2O_3$ and was small in increase of the micro Vickers hardness. However, No. 37 in Table 7 contained 20% by weight of $B_2O_3$ and markedly increased in the micro Vickers hardness. Therefore, the $B_2O_3$ content is more preferably 20% by weight or less.

When oxides such as $Al_2O_3$, ZnO, etc. are contained, the micro Vickers hardness can be improved, but No. 47 and No. 48 in Table 7 did not vitrify because the total content of $Al_2O_3$, ZnO and $R_2O$ (R: an alkali metal element) was 30% by weight, irrespective of the kind of the alkali metal oxide. In No. 34 in Table 6, the total content of $Al_2O_3$, ZnO and $R_2O$ (R: an alkali metal element) was 25% by weight and in No.35 the total content was 21% by weight, and they vitrified. Therefore, the total content of $Al_2O_3$, ZnO and $R_2O$ (R: an alkali metal element) is preferably 25% by weight or less.

In No. 25 and No. 27 in Table 6, a part of PbO was replaced with $Bi_2O_3$ which is one of heavy metal oxides. These glasses were greatly improved in the micro Vickers hardness due to containing of an oxide of Er. However, since they deeply colored, it was difficult to find cracks or bubbles inside the glass. Therefore, it is not preferred to use these glasses as sealing glass. As the oxides which cause coloration of glass, there are additionally $Sb_2O_3$, $Fe_2O_3$, etc. For this reason, No. 28 was also not preferred as a sealing glass.

Furthermore, the glass of No. 26 which contained $TeO_2$ was greatly improved in the micro Vickers hardness due to the addition of Er oxide and was superior in transparency. However, upon making a structure using it and examining the generation of bubbles, there were many bubbles in the glass and, thus, this was not preferred as a sealing glass.

From the above, the heavy metal oxide is more preferably an oxide of lead.

No. 80 and No. 81 in Table 9 did not vitrify at the time of preparing the glass. Therefore, these glasses are not preferred as sealing glass. Furthermore, when structures were made using these glasses and additionally No. 82, the glasses lost flowability and the grooves of the substrate in FIG. 8 were not filled with the glasses. Therefore, these glasses are difficult to use as sealing glasses.

Observation of the glasses prepared in the above Examples by a transmission type electron microscope showed that there were present fine particles of several nm to several ten nm though the particle size varies depending on the glasses. It is considered that the micro Vickers hardness increased due to the presence of these fine particles.

From the above Examples 2 and 3, it can be seen that a satisfactory glass can be obtained when it comprises, in terms of the following oxides, PbO: 44–91% by weight, $B_2O_3$: 6% by weight or more, $SiO_2$: 0–30% by weight, the total of $SiO_2$ and $B_2O_3$: 6–40% by weight, and $Ln_2O_3$ (Ln: Y, Pr, Nd, Sm, Eu, Gd, Tb, Dy, Ho, Er, Tm, Yb, Lu); 0.3–2.9% by weight and when fine particles are uniformly dispersed in the glass.

More preferably, the mechanical strength can be remarkably improved when it comprises PbO: 44–77% by weight, $B_2O_3$: 6–20% by weight, $SiO_2$: 0–30% by weight, at least one of ZnO, $Al_2O_3$ and $R_2O$ (R: an alkali metal element): 0–25% by weight and $Ln_2O_3$ (Ln: Y. Pr, Nd, Sm, Eu, Gd, Tb, Dy, Ho, Er, Tm, Yb, Lu): 0.5–1.5% by weight and when fine particles are uniformly dispersed in the glass.

EXAMPLE 4

Table 10 shows amount of the filler added to the sealing glass prepared by mixing various low-expansion filler powders with the glass of No. 14 in Table 1, particle size of the filler, and thermal expansion coefficient ($\alpha$, 50–300° C.), transition temperature (Tg/° C.) and deformation temperature (Td/° C.) obtained from thermal expansion characteristics, and micro Vickers hardness (Hv) of the glass. $ZrSiO_4$, $PbTiO_3$, $\beta$-eucryptite and silica glass were used as the fillers. The amount and particle size of the fillers were those which were the most preferred for each of the fillers.

TABLE 10

| No. | Glass | Filler | Amount (Vol %) | Particle size (μm) | α(×10⁻⁷/° C.) (50~300° C.) | Tg (° C.) | Td (° C.) | Hv |
|---|---|---|---|---|---|---|---|---|
| 83 | 14 | ZrSiO₃ | 44 | 15.0 | 72.6 | 382 | 421 | 465 |
| 84 |  | PbTiO₃ | 10 | 6.2 | 64.7 | 375 | 414 | 460 |
| 85 |  | β-eucryptite | 21 | 25.0 | 52.3 | 381 | 420 | 471 |
| 86 |  | Silica glass | 15 | 4.5 | 69.4 | 386 | 425 | 472 |
| 14 |  | — | — | — | 116.8 | 379 | 418 | 462 |

This sealing glass was prepared in the following manner. A block of the glass No. 14 was ground by a mill to make powders. Then, the low-expansion filler powder was added thereto, followed by wet mixing using acetone. Thereafter, the mixture was molded into pellets of about 40 mm+, which were heated at 500° C. to sinter the glass powder and the low-expansion filler powder to obtain a block of the sealing glass. Test pieces for thermal expansion characteristics and micro Vickers hardness were cut out from this block and subjected to the tests.

As shown in Table 10, the thermal expansion coefficient of the glass No. 14 containing no low-expansion filler was about $117 \times 10^{-7}/°$ C. while that of the sealing glasses of Nos.83–86 containing the low-expansion fillers was $52–72 \times 10^{-7}/°$ C. The glass transition temperature and the deformation temperature somewhat differed from those of the glass No. 14. This is because Zr, Si, etc. which were components of the fillers were taken into the glass structure owing to the reaction which took place by heating after addition of the fillers. Moreover, the micro Vickers hardness was very high, namely, about 470.

As mentioned above, bond portions of high reliability can be obtained even for the materials of low thermal expansion coefficient by using a sealing glass prepared by adding a low-expansion filler to a glass which contains a rare earth element and in which fine particles are unifromly dispersed. Furthermore, from Example 1, the rare earth elements to be added are preferably one or more of Pr, Nd, Sm, Eu, Gd, Tb, Dy, Ho, Er, Tm, Yb and Lu.

Furthermore, from the investigation in Example 2, the particle size of the fine particles present in the glass is preferably 1–50 nm. It is further preferred that the glass contains an oxide of lead and boron oxide and/or silicon oxide. Moreover, the low-expansion fillers used are preferably one or more of zirconium silicate, lead titanate, β-eucryptite and silica glass.

Figure 12:
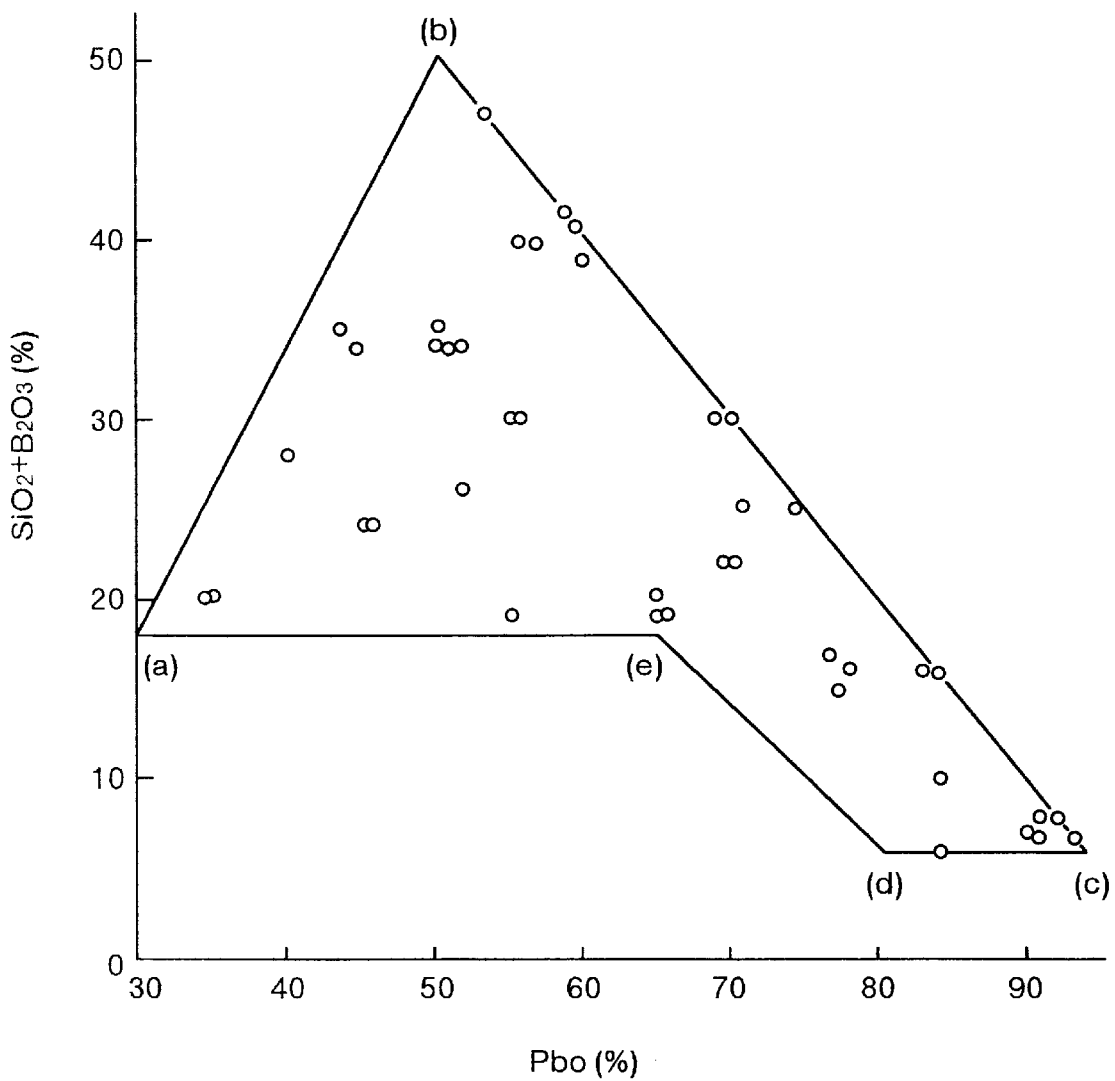
FIG. 12 is a graph which shows the composition of $PbO—SiO_2+B_2O_3$.

FIG. 12 is a graph which shows the relation between the amount of PbO and the amount of $SiO_2+B_2O_3$ in Examples 1–4. The amount of PbO and that of $SiO_2+B_2O_3$ in these Examples are in the area surrounded by the line drawn linking point a (30%, 18%), point b (50%, 50%), point c (94%, 6%), point d (80%, 6%), point e (65%,. 18%) and the point a, and in this area, the Vickers hardness can be 370 or higher and the deformation temperature can be 500° C. or lower.

Figure 13:
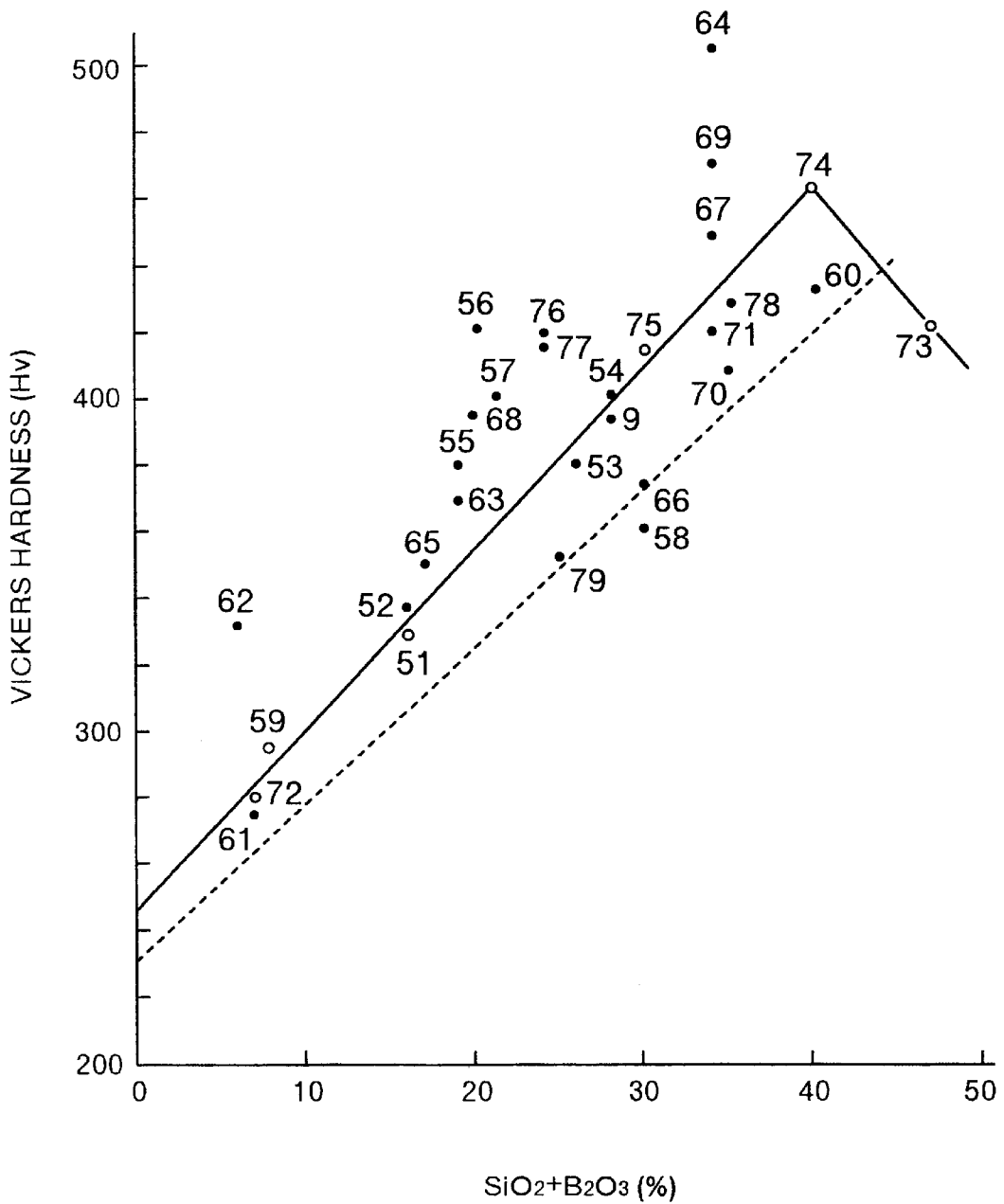
FIG. 13 is a graph which shows the relation between the Vickers hardness and the amount of $SiO_2+B_2O_3$.

FIG. 13 shows the relation between the amount of $SiO_2+B_2O_3$ and the Vickers hardness. As shown in this figure, the hardness increases with increase of the amount of $SiO_2+B_2O_3$. The white dot indicates the ternary system of PbO—$SiO_2$—$B_2O_3$ and the black dot indicates the above ternary system which additionally contains other components excluding the rare earth elements. As shown in this figure, some of the glasses containing $Al_2O_3$, ZnO, $Na_2O$, $K_2O$, $Bi_2O_3$, $TeO_2$, $Pe_2O_3$ in addition to $SiO_2+B_2O_3$ increase in the hardness and others decrease in the hardness than the ternary system. These components are organically related with each other and glasses of the desired hardness and deformation temperature can be obtained by the mutual combinations.

The solid line in the figure can be obtained by linking the points of ($SiO_2+B_2O_3$ 8%, Hv 290), ($SiO_2+B_2O_3$ 40%, Hv 462), and ($SiO_2+B_2O_3$ 47%, Hv 422) from the relation between the amount of $SiO_2+B_2O_3$ and the hardness. The especially preferred hardness Hv is a hardness higher than the value obtained from the formula $242+5.5\times[SiO_2(\%)+B_2O_3(\%)]$. The hardness Hv of the dotted line is preferably higher than the value obtained from the formula $230+5.23\times[SiO_2(\%)+B_2O_3(\%)]$.

Figure 14:
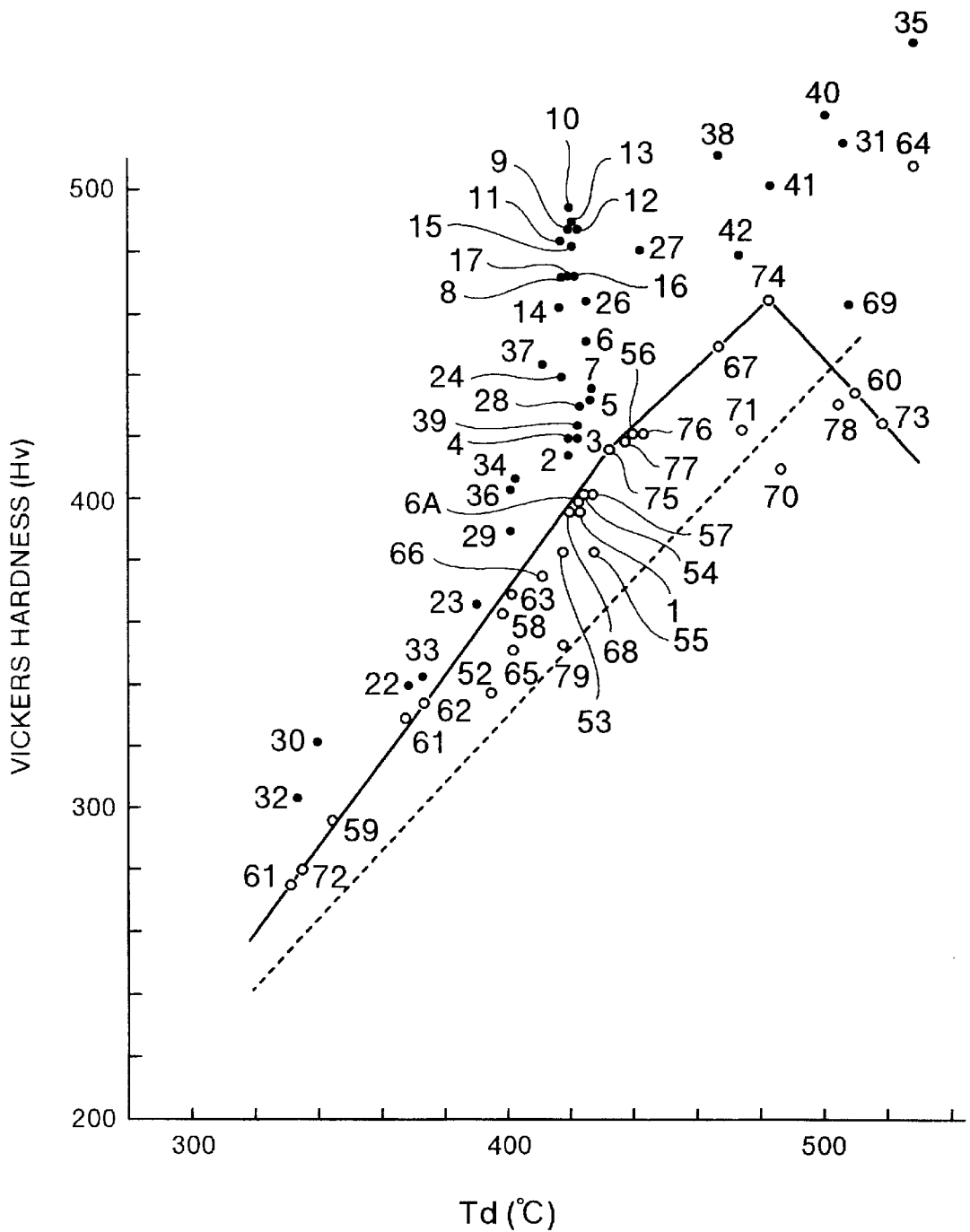
FIG. 14 is a graph which shows the relation between the Vickers hardness and the deformation temperature Td.

FIG. 14 shows the relation between the Vickers hardness and the deformation temperature. As shown in this figure, the hardness increases with increase of the deformation temperature. The white dot indicates the ternary system containing $SiO_2+B_2O_3$ and this ternary system which additionally contains other components excluding the rare earth elements, and the line is of the ternary system. The black dot indicates the glass containing rare earth elements, and higher hardness is obtained at the same deformation temperature than those of the ternary system. It is considered that this is because fine precipitate was produced with the rare earth elements. The solid line in the figure can be obtained by linking the points of (Td 330° C., Hv 260), (Td 432° C., Hv 416), (Td 481° C., Hv 462), and (Td 519° C., Hv 422) from the relation between the hardness and the deformation temperature. The especially preferred are those having a hardness above the solid line. The hardness of the glass of the dotted line is obtained from the formula $-102+1.087\times$ Td(° C.) and preferred are those having a hardness higher than the value obtained from the formula.

EXAMPLE 5

Evaluation was carried out with respect to other utilization field of glass. Table 11 shows compositions of glass evaluated. No. 87 is a borasilicate glass, No. 88 is a pannel glass for a cathode-ray tube, and No. 89 is a soda-lime glass. The borosilicate glass is used for heat resistant materials such as a Pyrex glass, a glass pannel for a liquid crystal display, and the like. The soda-lime glass is used for a plate glass, a pannel glass for a plasma display, and the like. To these types of glass, one of rare earth metal oxides, i.e., $Er_2O_3$ is added in the amount shown in Table 11. For reference, Hv of each of the glass before adding $Er_2O_3$ is also shown in Table 11. As seem from this table, Hv of each of the glass was considerably enhanced by adding the rare earth metal oxide. By the observation of these glass materials containing the rare earth metal oxide by a transmission electron microscope, fine particles having particle diameter of about 10 nm were found. Thus, the advantageous effect of the present invention can be attained in the case of the borosilicate glass, soda- lime glass, and the like.

TABLE 11

| No. | Composition (wt %) | | | | | | | | | Hv (before adding Er$_2$O$_3$) | Hv (after adding Er$_2$O$_3$) |
|---|---|---|---|---|---|---|---|---|---|---|---|
| | SiO$_2$ | B$_2$O$_3$ | Na$_2$O | Al$_2$O$_3$ | CaO | MgO | BaO | PbO | Er$_2$O$_3$ | | |
| 87 | 80.9 | 12.8 | 4.0 | 2.3 | — | — | — | — | 5.0 | 620 | 702 |
| 88 | 62.4 | — | 15.9 | 3.7 | 1.8 | 1.1 | 12.5 | 2.6 | 13.0 | 522 | 599 |
| 89 | 72.5 | — | 14.0 | 1.4 | 8.0 | 4.1 | — | — | 10.0 | 615 | 683 |

EXAMPLE 6

This Example shows a structure constructed by bonding two materials using a low-temperature sealing glass. As the materials to-be bonded flat plates of Mn—Zn ferrite single crystal were used. The glass of No. 14 was used as the sealing glass. As comparative examples, the similar structures were made using the glass of No. 79 in Table 7 having the nearly the same deformation temperature as the glass of No.14 and a ZnO—B$_2$O$_3$—SiO$_2$—Na$_2$O—BaO glass (A) having a deformation temperature higher 100° C. than that of the glass No. 14. The glass (A) is high in deformation temperature and high in mechanical strength, and, hence, is used for bonding of materials high in heat resistance.

The structure was made by sandwiching the sealing glass plate somewhat smaller in size than the ferrite plate between two ferrite single crystal flat plates of 20 mm long, 15 mm wide and 1 mm thick and heat treating them under application of a load to obtain a bonded structure. The heat treating was carried out at 580° C. for 30 minutes under vacuum for the glasses of Nos.14 and 79, and at 750° C. for 10 minutes under vacuum for the glass (A). The resulting bonded structures were cut to 2 mm wide, 1 mm long and 2.2 mm thick.

Bond strength of the bonded portion of the structures was measured. FIG. 9 is an oblique view which shows the measuring method. The test piece cut out was set on the three-point bending strength measuring jigs 4, 4' so that the bonded face of the test piece was perpendicular to the ground and parallel with the longer direction of the three-point strength measuring jigs. The span n between 4 and 4' was 1.2 mm. After setting the sample, a load w was applied to the test piece by loading jig 3, and the maximum stress was taken to be a breaking load and breaking stress σ was calculated by the following formula.

$$\sigma = \frac{3wn}{2at^2}$$

wherein a is the width of the test piece and t is the thickness of the glass.

TABLE 12

| No. | The number of measurement | σ(MPa) | Made of breaking | Note |
|---|---|---|---|---|
| 14 | 40 | 100 | Ferite | Example |
| 79 | 42 | 80 | Glass, interface | Comparative Example |
| (A) | 41 | 90 | Ferite | Comparative Example |

The average breaking stress a and breaking mode of the structures bonded using the respective glasses are shown in Table 12. As shown in this table, the breaking stress of the structure made using the glass No. 14 and that of the structure made using the glass No. 79 were 100 MPa and 80 MPa, respectively, and the breaking stress of the former was higher 20% than that of the latter. The breaking stress of the structure made using the glass (A) was 90 MPa. Thus, the structure made using the glass No. 14 showed the higher breaking stress.

The mode of breaking of the test piece was observed to find that the breaking occurred at the bonding interface or the glass part in the structure made using the glass No.79 while the breaking occurred at the ferrite substrate in most of the test pieces of the structures made using the glass No.14 and the glass (A). Thus, the structure made using the glass of the present invention had a mechanical strength equal to or higher than the structure bonded at a high temperature using the glass of high deformation temperature in spite of the fact that the bonding temperature was low. Thus, high reliability of the bonded part could be attained in the structure of the present invention.

As shown above, the structure of the present invention had a bond portion very high in reliability. That is, the reliability of the glass per se is high by using a glass capable of bonding at low temperatures and high in mechanical strength as shown in Example 1. Further, since this glass generates few bubbles and intimately bonds to the material to be bonded, breaking at the bonding interface hardly occurs.

EXAMPLE 7

The same structure as of FIG. 7 and Exampl 6 was made using the sealing glass of No. 84 in Table 10. A sintered α-alumina having a thermal expansion coefficient of 70×10$^{-7}$/° C. was used as the substrate and the material to be bonded. The bonding conditions were the same as in Examples 1 and 6. Neither bubbles nor cracks were seen and wettability to the substrate and the material to be bonded was satisfactory. Moreover, a structure having a satisfactory bond strength and a glass bonding part high in reliability was obtained.

EXAMPLE 8

Figure 15:
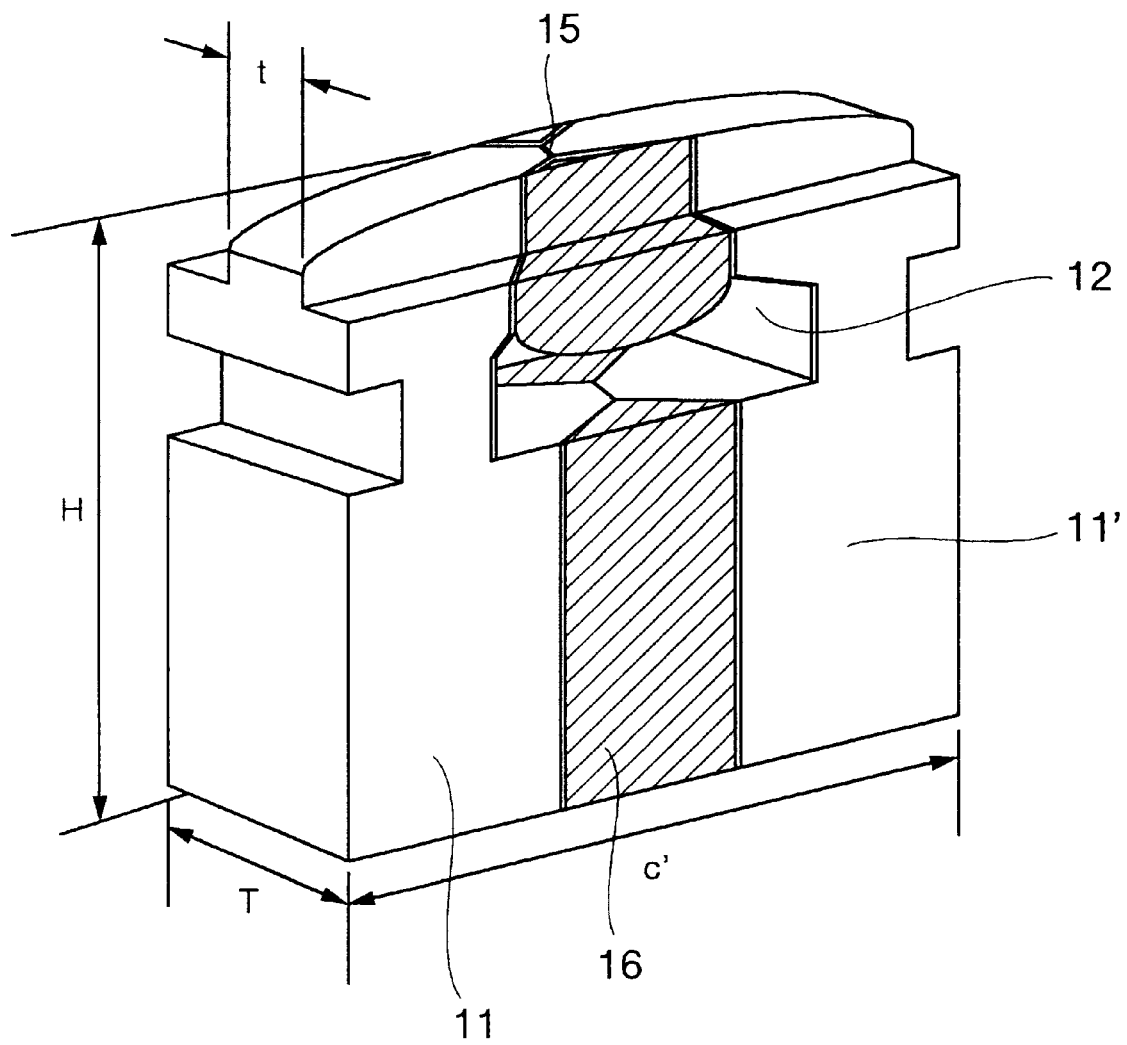
FIG. 15 is an oblique view of a magnetic head of the present invention.
Figure 16:
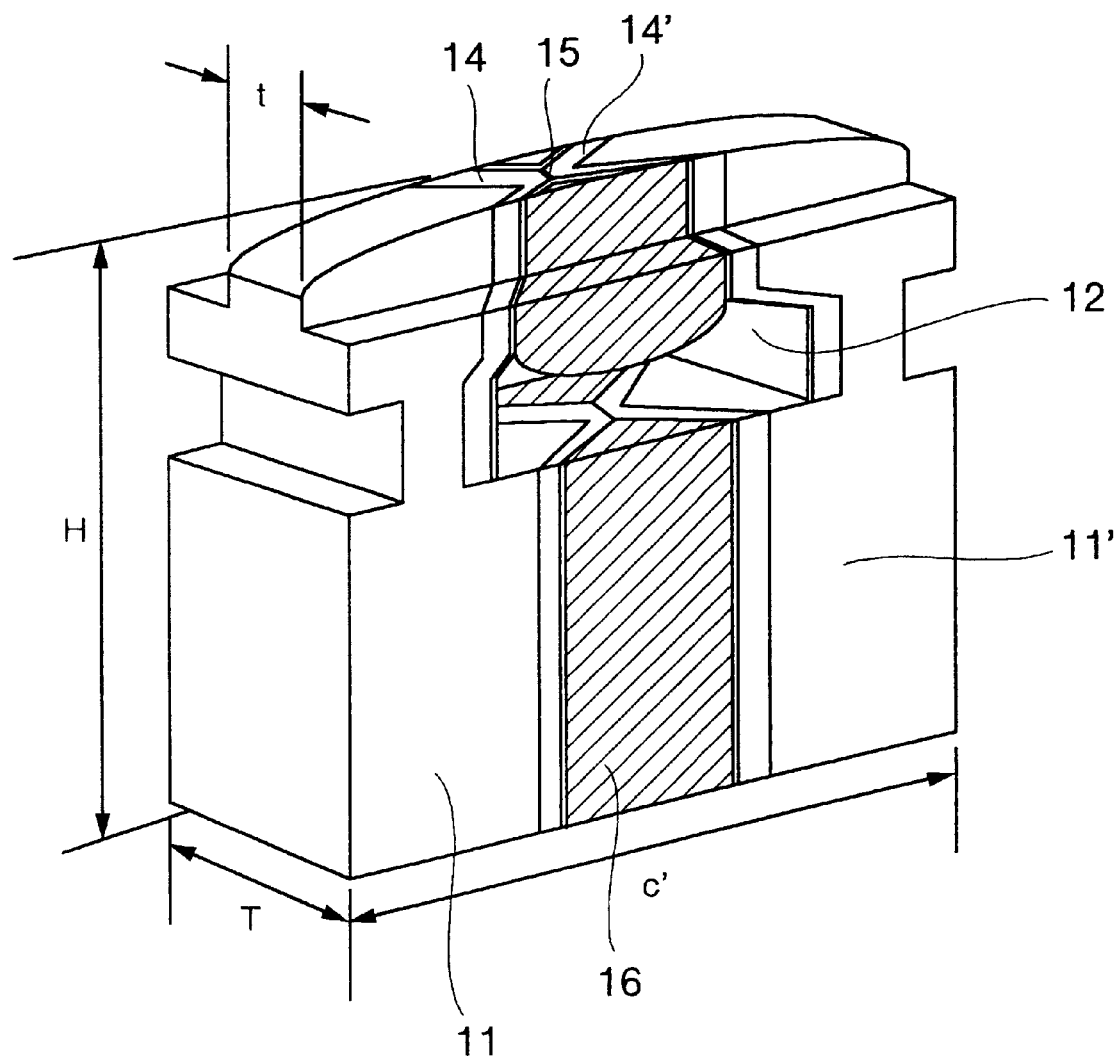
FIG. 16 is an oblique view of a magnetic head having the magnetic film according to the present invention.

Magnetic heads were made using the sealing glasses of the present invention shown in Examples 1–4. FIG. 15 and FIG. 16 are oblique views of a magnetic head made in accordance with the present invention. FIG. 15 shows so-called ferrite head using Mn—Zn ferrite single crystal. FIG. 16 shows a magnetic head made by forming a magnetic film by sputtering using the Mn—Zn ferrite single crystal as a support. The reference numerals 11, 11' indicate magnetic cores, 12 indicates a coil winding window, 14 indicates a magnetic film, 15 indicates a magnetic gap, and 16 indicates a sealing glass. The symbol t indicates a sliding width, T indicates a core width which was about 0.15 mm, C' indicates a core thickness which was about 2.3 mm, H indicates a height of the head which was about 1.7 mm, and the core width t of sliding part was about 0.14 mm. In this Example, an Fe—Ta—C magnetic film (saturated magnetic flux density Bs=12000 gausses) was used as the magnetic film 14. The magnetic head shown in FIG. 16 is hereinafter referred to as FTC head.

Figure 17:
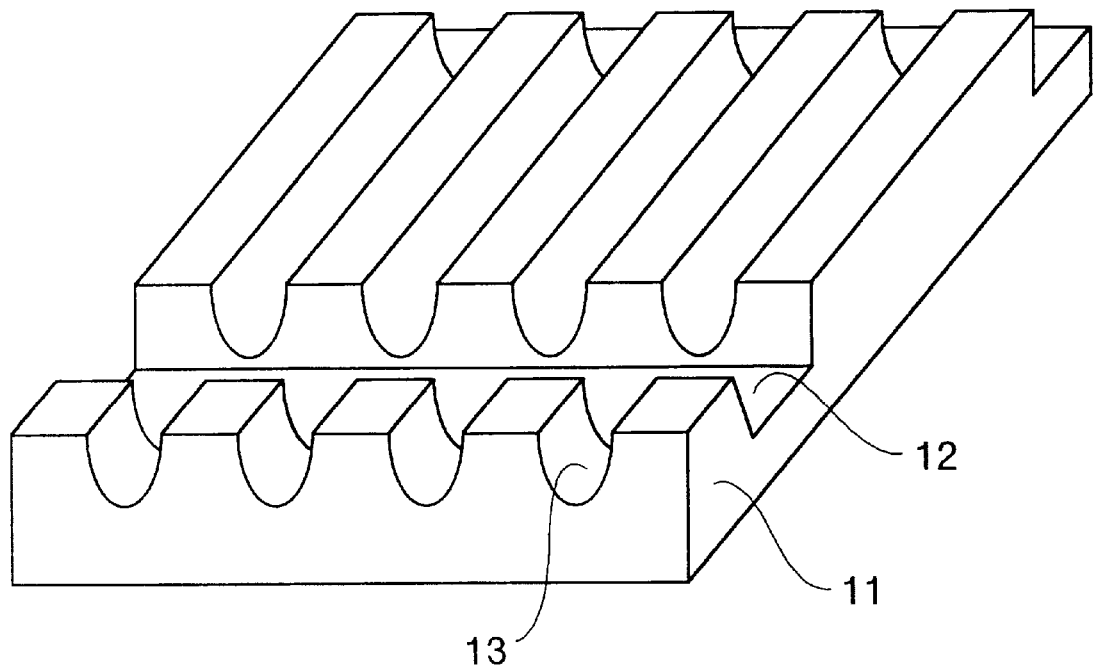
FIG. 17 shows the procedure of making a magnetic head.
Figure 18:
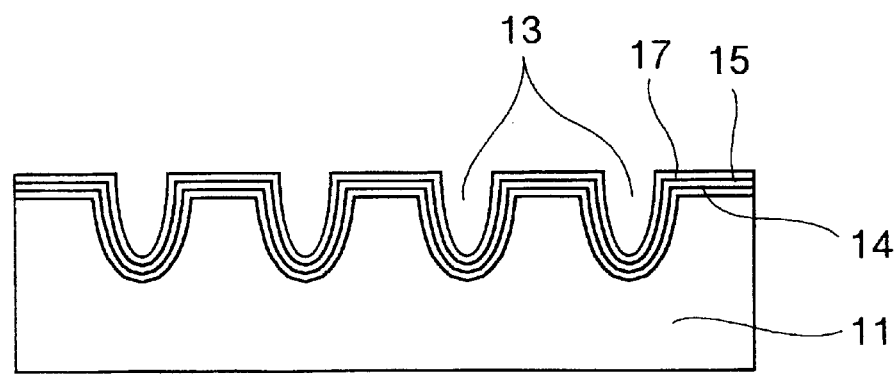
FIG. 18 shows the procedure of making a magnetic head.
Figure 19:
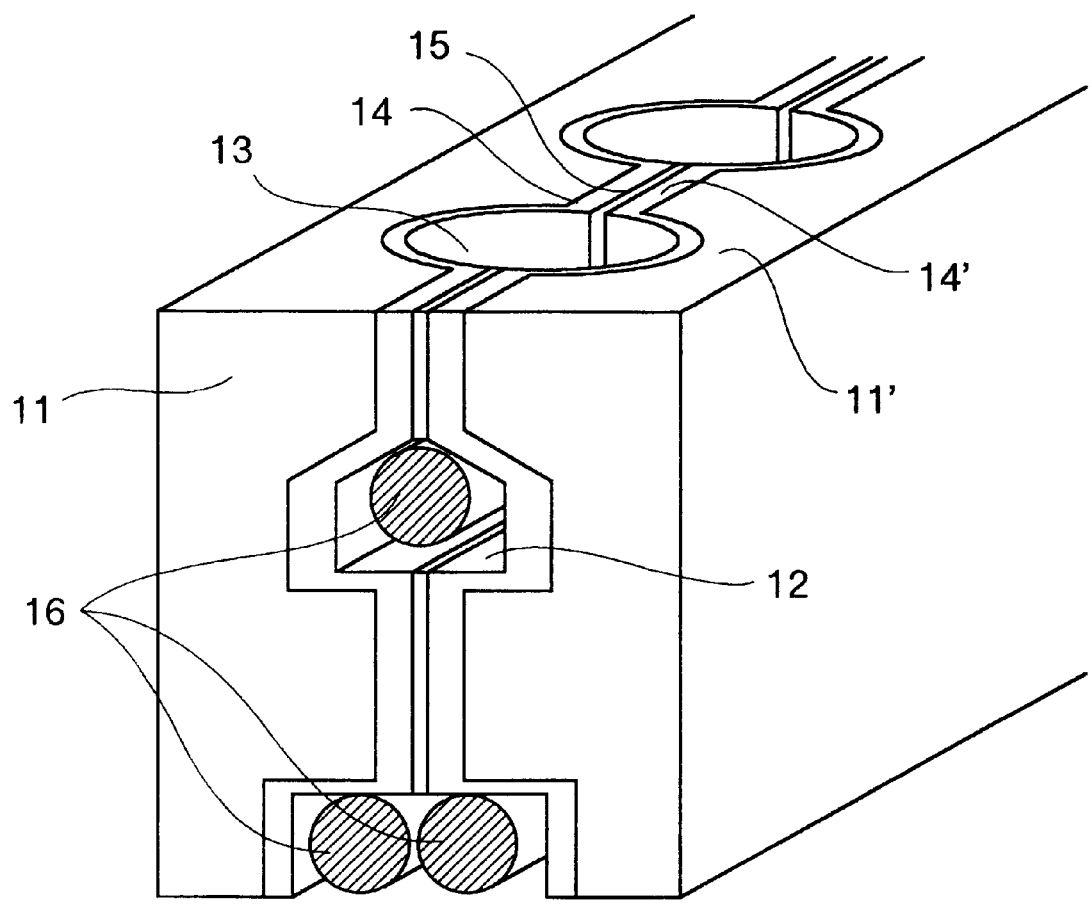
FIG. 19 shows the procedure of making a magnetic head.

FIGS. 17–19 show a method for making the magnetic head of the present invention. As shown in FIG. 17, a coil winding groove 12 and track grooves 13 were cut in a substrate which was magnetic core 11, thereby to form a magnetic gap face. Then, as shown in FIG. 18, the Fe—Ta—C magnetic film 14 of about 5 μm was formed on the magnetic gap face by high frequency sputtering method. Furthermore, an $SiO_2$ layer 15 of about 0.15 μm as a gap spacer was formed by high frequency sputtering method on the magnetic core 11 as a substrate or on the magnetic film 14. In addition, Cr film 17 of about 0.10 gm was formed as a reaction inhibiting film for inhibition of reaction with the sealing glass.

Next, as shown in FIG. 19, magnetic cores 11 and 11' as substrates on which the magnetic film as the magnetic core was formed were butted to each other from left and right, and sealing glass rod 16 was placed and heated to a temperature at which the viscosity of the glass reached $10^4$ poises in a vacuum and the assembly was maintained for 25 minutes to bond the left and right core blocks. When cooled at a rate of 1–2° C./min, the assembly was kept at a temperature lower about 70° C. than the sealing temperature for 20 minutes. Then, the assembly was subjected to abrasion, grinding and cutting to obtain an FTC head shown in FIG. 16. The ferrite head shown in FIG. 15 was made in the same manner as above, except for omitting the step of forming the Fe—Ta—C magnetic film 14 and the reaction inhibiting film 17 on the magnetic gap face.

Next, the sealing glass used for bonding will be studied. Since the Fe—Ta—C magnetic film has a saturated magnetic flux density of 1.3–1.5 tesla, but is low in resisting temperature, namely, 600° C., the bonding step with glass must be carried out at lower than that temperature.

is low, namely, 411° C., and, therefore, the bonding temperature can be lower than 600° C. Thus, the total content of $B_2O_3$ and $SiO_2$ is desirably 30% by weight or less. Moreover, from Example 3, the content of PbO is preferably 44–77% by weight. Further, the content of $B_2O_3$ is preferably 6–20% by weight and that of $SiO_2$ is preferably 30% by weight or less. When the glass contains $Al_2O_3$, ZnO and $R_2O$ (R: an alkali metal element), a magnetic head having glass bonding part of high reliability can be obtained.

For the above reasons, glasses Nos. 10, 14, 6B, 34, 37 and 39 were selected as the sealing glass and FTC heads were made. As comparative examples, FTC heads were similarly made selecting glasses of No. 55 and No. 79 from Tables 8 and 9. Further, a ferrite head was also made using the glass of No. 14. No. of the sealing glass, bonding temperature, production yield (%), head chip strength (gf), head performances and head breaking time in sliding test conducted at a relative speed with magnetic recording medium of 11, 20 and 52 m/sec are shown in Table 13. A metal tape or metal deposited tape having a coercive force of at least 1000 Oe, preferably at least 1500 Oe was used as the magnetic recording medium.

Figure 20:
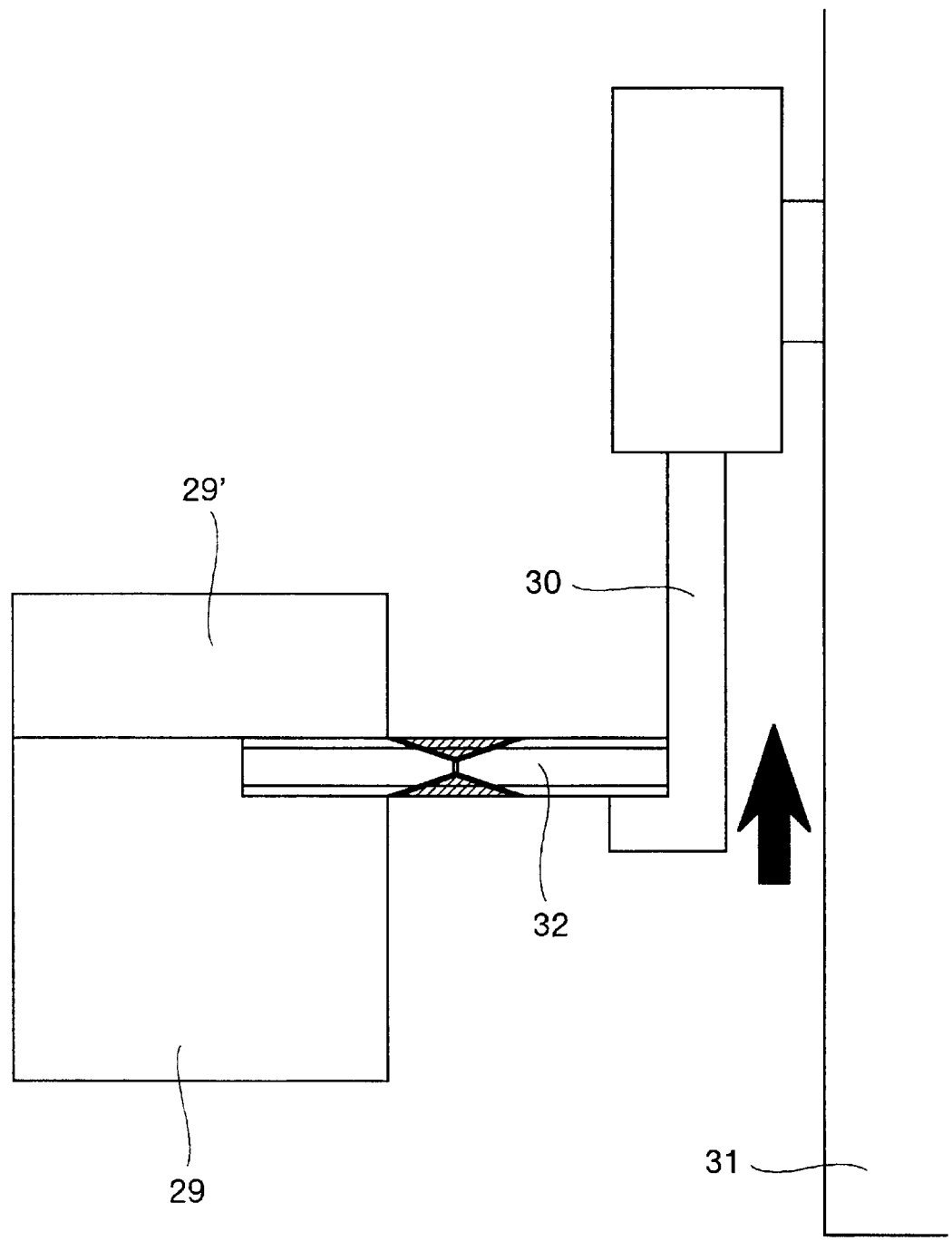
FIG. 20 shows a jig for measuring the strength of head chip.

The head chip strength was measured by the tensile test method shown in FIG. 20. In FIG. 20, 29, 29' indicate fixing jigs for head chip, 30 indicates a folding resistance tester, 31 indicates a folding resistance tester installing stand, and 32 indicates a head chip. The head performance was determined by winding five head chips with coils and evaluating the magnetic characteristics thereof. The samples having good results are shown by "○" and those having problems are shown by "Δ". With reference to the head breaking time in the sliding test, the head chips which broke in more than 500 hours are shown by "⊙", and when the head chip broke in less than 500 hours, the time required for breaking is mentioned. The sliding width t of the magnetic head was 65 μm, the core width T was 207 μm, the core thickness C' was 1.52 mm and the height H of the head was 1.9 mm.

TABLE 13

|  | No. | Bonding temperature (° C.) | Yield (%) | Chip strength (gf) | Head performance | Head breaking time (hr) | | |
|---|---|---|---|---|---|---|---|---|
|  |  |  |  |  |  | Relative speed 11 (m/sec) | Relative speed 20 (m/sec) | Relative speed 52 (m/sec) |
| FTC head | 10 | 580 | 96 | 402 | ○ | ⊙ | ⊙ | ⊙ |
|  | 14 | 580 | 94 | 386 | ○ | ⊙ | ⊙ | ⊙ |
|  | 6B | 580 | 89 | 271 | ○ | ⊙ | ⊙ | ⊙ |
|  | 34 | 540 | 64 | 254 | ○ | 314 | 209 | 120 |
|  | 37 | 560 | 90 | 323 | ○ | ⊙ | ⊙ | ⊙ |
|  | 39 | 590 | 90 | 311 | ○ | ⊙ | ⊙ | ⊙ |
|  | 55 | 580 | 56 | 250 | ○ | ⊙ | 394 | 245 |
|  | 79 | 560 | 62 | 210 | ○ | 493 | 336 | 216 |
| Ferrite | 14 | 580 | 94 | 400 | Δ | ⊙ | ⊙ | ⊙ |

Therefore, the galsses of Nos. 31 and 35 in Table 6 and Nos. 38, 40, 41, and 42 in Table 7 which have a deformation temperature of 450° C. or higher are difficult to carry out the bonding at lower than 600° C. Thus, they are not preferred as sealing glass for magnetic heads having the Fe—Ta—C magnetic film.

That is, the total content of network forming oxide components such as $B_2O_3$ and $SiO_2$ in these glasses is about 35% by weight and, so, are high in characteristic temperature. The total content of $B_2O_3$ and $SiO_2$ in the glass No. 37 in Table 7 is 30% by weight, but its deformation temperature The head chips prepared by bonding with the glasses of Nos. 10, 14, 37 and 39 had a yield of more than 90% and a chip strength of higher than 300 g, and had a high reliability. Furthermore, these head chips did not break for more than 500 hours in the sliding test of 52 m/sec in relative speed. On the other hand, in the case of using the glasses of No. 6B and 34, the head chips were higher in the yield and the strength than those prepared by bonding with the comparative glasses of Nos. 55 and 79, but were less than 90% in the yield and lower than 300 g in the chip strength. Besides, the results of the sliding test were less than 500 hours under some conditions, and these heads can hardly be said to have high reliability.

It is considered that this is because micro Vickers hardness of glasses of Nos. 10, 14, 37 and 39 was 425 or higher while that of glasses of Nos. 6B and 34 was 405 and 422, which were lower than 425. Thus, the micro Vickers hardness of the sealing glass to be used is preferably 425 or higher.

The ferrite head was small in output and had problems in head performance, but was 94% in the yield, 400 gf in the chip strength and more than 500 hours in head breaking time and was high in reliability. In this way, according to the present invention, the same glass can be used between different kind of magnetic heads such as FTC head and ferrite head. Accordingly, productivity can be markedly improved.

From the above, magnetic heads of high reliability can be obtained by using the sealing glass of the present invention shown in Examples 1–4. Moreover, in order to obtain magnetic heads of high performance, the magnetic cores preferably comprise a support on which a magnetic film is formed, and more preferably the magnetic film is Fe-based magnetic film. Further, by making magnetic heads using the sealing glass of the present invention, the mass-production efficiency and the production yield can be improved.

In this Example, the magnetic heads were maintained at a temperature lower about 70° C. than the glass sealing temperature in the process of making them. These magnetic heads were compared on the head chip strength with those made without the above maintenance in cooling. The glass of No.14 was used as the sealing glass. As a result, the head chip strength of the magnetic heads maintained in cooling was higher about 10% than that of the magnetic heads which were not maintained in cooling. It is considered that this is because production of the fine particles in the glass is accelerated by the maintenance in cooling and the mechanical strength of the glass per se is improved.

Thus, in making magnetic heads using a glass containing rare earth elements as sealing glass, those of higher reliability can be obtained by producing fine particles in the sealing glass, for example, by the method of carrying out the heat treatment at a temperature lower than the glass filling temperature.

EXAMPLE 9

Three kinds of head chips of 100 μm, 65 μm and 55 μm in sliding width were prepared using Nos.10, 14, 6B and 79 as sealing glass. The chip strength, head performance and head breaking time were evaluated in the same manner as in Example 8. The results are shown in Table 14.

TABLE 14

| No. | Slinding width (μm) | Yield (%) | Chip strength (gf) | Head performance | Tape touch | Head breaking time (hr) Relative speed 11 (m/sec) | Relative speed 20 (m/sec) | Relative speed 52 (m/sec) | Apparatus performance Relative speed 11 (m/sec) | Relative speed 20 (m/sec) | Relative speed 52 (m/sec) |
|---|---|---|---|---|---|---|---|---|---|---|---|
| 10 | 100 | 99 | 410 | ○ | Δ | ⊚ | ⊚ | ⊚ | Δ | Δ | Δ |
|    | 65  | 96 | 402 | ○ | ○ | ⊚ | ⊚ | ⊚ | Δ | ○ | ○ |
|    | 55  | 95 | 400 | ○ | ○ | ⊚ | ⊚ | ⊚ | Δ | ○ | ○ |
| 14 | 100 | 98 | 388 | ○ | Δ | ⊚ | ⊚ | ⊚ | Δ | Δ | Δ |
|    | 65  | 94 | 386 | ○ | ○ | ⊚ | ⊚ | ⊚ | Δ | ○ | ○ |
|    | 55  | 94 | 387 | ○ | ○ | ⊚ | ⊚ | ⊚ | Δ | ○ | ○ |
| 68 | 100 | 92 | 270 | ○ | Δ | ⊚ | ⊚ | ⊚ | Δ | Δ | Δ |
|    | 65  | 89 | 271 | ○ | ○ | ⊚ | 411 | 326 | Δ | X | X |
|    | 55  | 86 | 266 | Δ | ○ | 352 | 294 | 243 | X | X | X |
| 79 | 100 | 76 | 216 | ○ | Δ | ⊚ | ⊚ | 450 | Δ | Δ | X |
|    | 65  | 62 | 210 | ○ | ○ | 493 | 336 | 216 | Δ | X | X |
|    | 55  | 35 | 200 | Δ | ○ | 229 | 201 | 154 | X | X | X |

In view of the fact that magnetic recording and reproducing characteristics change depending on the state of contact between the magnetic head and the magnetic recording medium, the magnetic recording and reproducing characteristics were evaluated in terms of tape touch. The mark "○" means that the tape touch was good and "Δ" means that the tape touch was not good. The evaluation of apparatus was a synthetic evaluation of the characteristics obtained from the above parameters and output of the apparatus when the relative speed was changed to 11 m/sec, 20 m/sec, and 52 m/sec. The mark "○" shows that the results were good, "Δ" shows that problems remained in some of the parameters, and "x" shows that the samples could not be used as magnetic heads.

As for the magnetic heads made using the glasses Nos. 10 and 14, these could be made in high yields irrespective of the sliding width and had a high chip strength. Moreover, they are superior in head performance. Further, the head breaking time exceeded 500 hours even at a sliding width of 55 μm and a relative speed of 52 m/sec. In the case of the sliding width being 100 μm, the tape touch was inferior and the magnetic recording and reproducing characteristics were low, and the magnetic heads had problems in this respect. Even when the sliding width was 65 μm or more, there was a problem in the performance of apparatus at a relative speed of 11 m/sec.

On the other hand, as for the magnetic head made by bonding with No. 6B, occurrence of peeling at the glass bonding part or at the interface of the glass and the magnetic film increased with decrease in the sliding width at the time of making the head and the production yield decreased. The chip strength hardly changed since the core width was the same. When the sliding width was 100 μm, the tape touch was inferior. When the sliding width was 65 μm, the head breaking time was less than 500 hours at a relative speed of more than 20 m/sec. The magnetic head of 55 μm in the sliding width was unstable in output and inferior in the head performance. Moreover, the head breaking time was less than 500 hours. From the above, no good performances of apparatus were obtained when these magnetic heads were used. The magnetic head made by bonding with No. 79 showed nearly the same characteristics as those of the magnetic head made using No. 6B and was not good.

As explained above, magnetic recording and reproducing apparatuses of high performance can be obtained by mounting magnetic heads made using the sealing glass of the present invention shown in Examples 1–3. More preferably, the sliding width with the magnetic recording medium is 65 µm or less. Furthermore, when the relative speed with the magnetic recording medium is 20 m/sec or more, magnetic recording and reproducing apparatuses of further higher performance can be obtained.

EXAMPLE 10

Figure 21:
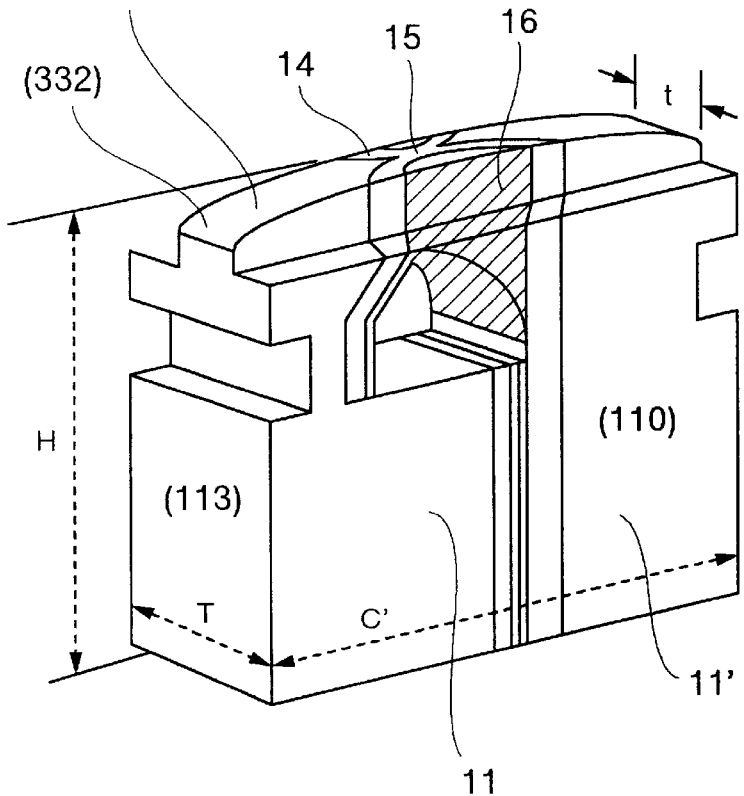
FIG. 21 is an oblique view of a magnetic head of the present invention.

FIG. 21 shows such a type that a sealing glass was formed at a thickness of about 0.3 mm by sputtering to perform bonding for a magnetic head comprising magnetic cores 11, 11' of the single crystal ferrite substrate of Example 8 and a magnetic film (Fe—Ta—C alloy) formed thereon by sputtering. This was somewhat lower than the type of Example 8 in the bond strength, but had the similar sliding characteristics. In the figure, (332), (113) and (110) show the index of plane of each surface. It is preferred that at least 90% of each of the parts has such index of plane.

In this figure, the height H was 2.0 mm, the width C' was 2.0 mm, the thickness T was 140 µm, and the sliding width t of the tape sliding face was 65 µm or 55 µm. The thickness T is preferably 0.05–0.1 time the width C'. The sliding width is further smaller for attaining further higher recording density.

EXAMPLE 11

Figure 22:
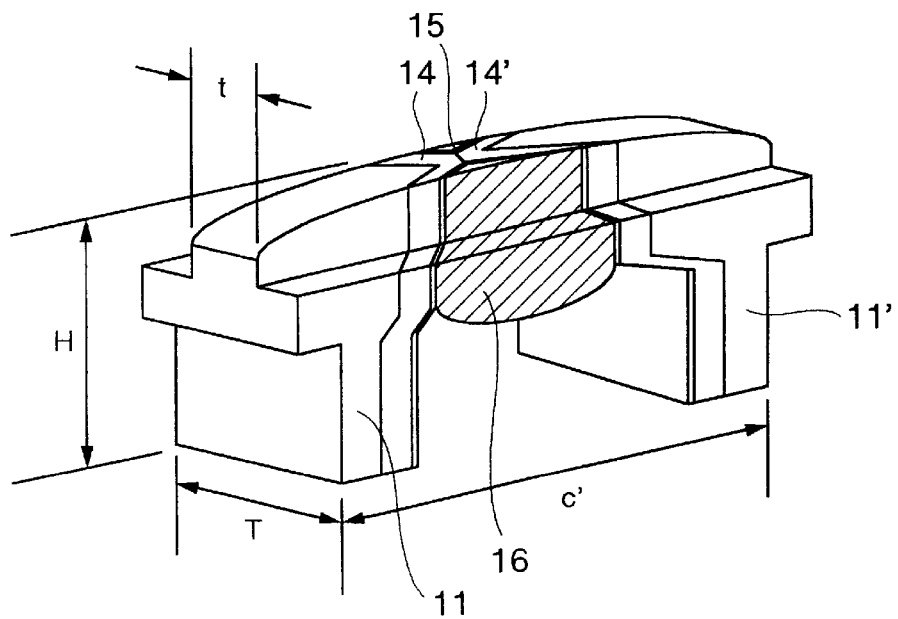
FIG. 22 is an oblique view of a magnetic head of the present invention.

A magnetic head shown in FIG. 22 was made using the sealing glass of the present invention. In FIG. 22, 11, 11' indicate magnetic cores comprising an Mn—Zn ferrite substrate, 14, 14' indicate magnetic films, 15 indicates a magnetic gap, and 16 indicates a sealing glass. In this Example, the height H of head was 0.7 mm and the core thickness C' was 1.5 mm. An Fe—Ta—C or Fe—Ta—N magnetic film having a saturated magnetic flux density of 1.0–1.5 T was used as the magnetic film. The method for making the magnetic head was the same as in Example 8, except that the shape of the magnetic core was changed. The glass of No. 14 in Table 1 was used as the sealing glass and the bonding was carried out in the same manner as in Example 9.

As shown in FIG. 22, in this magnetic head, the butting faces are only at the gap part and these butting faces were bonded with the sealing glass.

Figure 23:
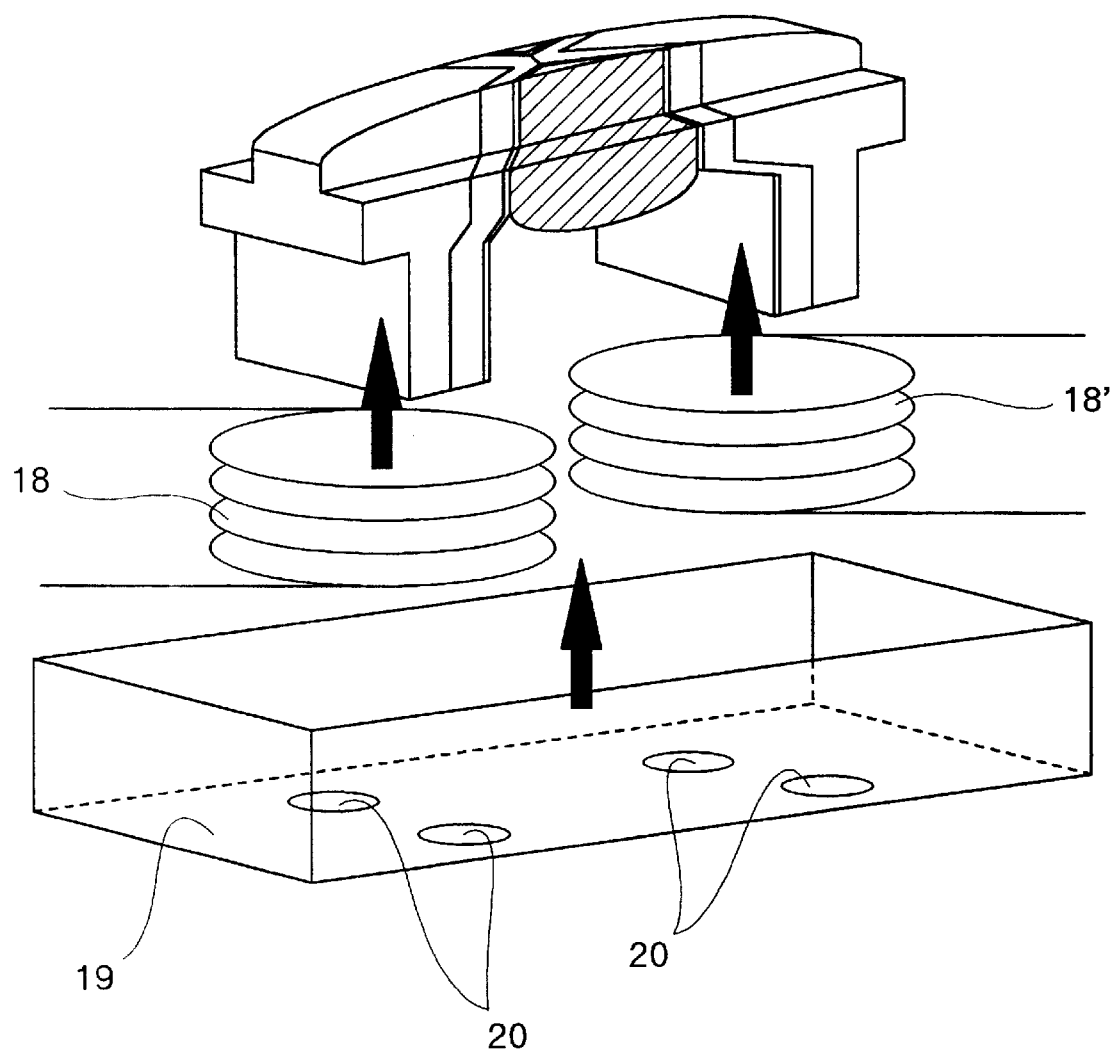
FIG. 23 shows a fitting method of the magnetic head according to the present invention.

As shown in FIG. 23, this magnetic head was fitted to an exclusive fitting jig. The fitting jig was made of an Fe—C type soft magnetic material. In FIG. 23, 18 indicates a coil fitted to the magnetic head, 19 indicates a fitting jig, and 20 indicates a terminal guiding hole for the coil. The coil 18 previously wound several times was fitted to the lower end of the magnetic core 11. The magnetic head fitted with the coil was fitted to the fitting jig and bonding was carried out. The terminal of the coil was guided to outside through the terminal guiding hole 20.

Since the Fe—C type soft magnetic material used as the fitting jig was electrically conductive, the static charge generated at the sliding could be earthed. Further, deterioration of magnetic characteristics due to the small head core could be prevented.

This magnetic head had such a structure that the part under the coil winding window of the conventional magnetic head was omitted, and the height H of the head was less than half that of the conventional magnetic head. Therefore, the weight of the magnetic head could be reduced to less than half. Thus, the power consumed by the motor rotating the cylinder could be reduced. Moreover, the sealing glass was filled in only the gap part and the two magnetic cores were bonded only by this sealing glass. Therefore, no sealing glass was filled in the part under the coil winding window and it was difficult to make the head without using the high strength sealing glass of the present invention.

Since fitting of the coil is completed only by fitting the wound coil, the conventional coil winding step could be markedly simplified. Further, since the height of head was less than half that of conventional ones, the time of cutting step could be reduced to about half. When cutting was carried out more slowly than usual, working yield of head chips could be improved and head chips of little chipping could be obtained.

EXAMPLE 12

Figure 24:
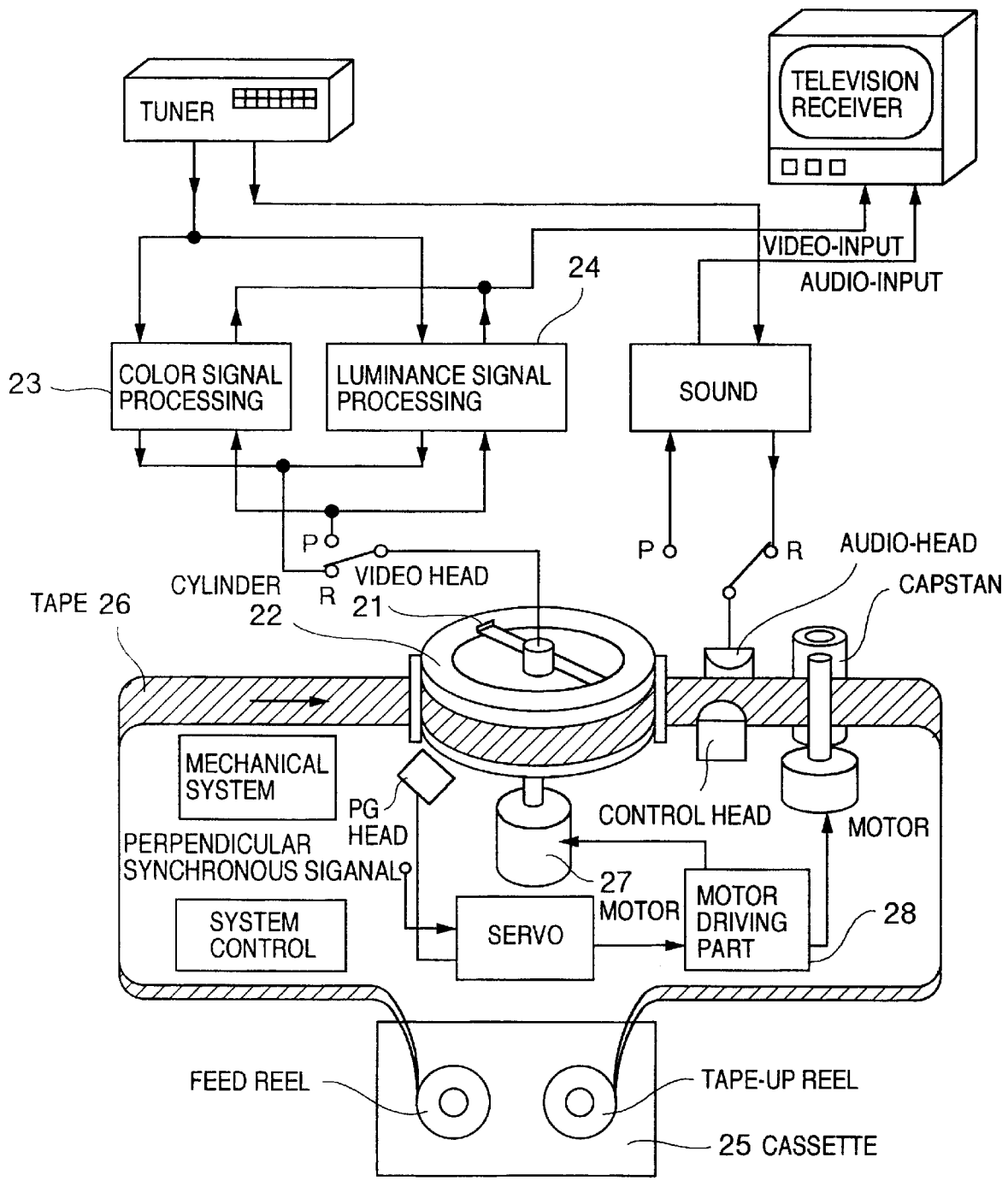
FIG. 24 is a block diagram of a magnetic recording and reproducing apparatus of the present invention.

FIG. 24 shows a schematic block diagram of a magnetic recording and reproducing apparatus mounted with the fitting jig fitted with the magnetic head obtained in Examples 8–10. Many video heads 21 which are the magnetic heads used are fitted to cyclinder 22. The video head 21 is connected with a control part comprising color signal processing part 23 and luminance signal processing part 24 which process the information collected so that it can read the information from magnetic recording tape 26 contained in cassette 25, and reproduce and record the information. Furthermore, the video head is connected to the driving part including motor 27 and motor driving part 28.

Recording and reproducing characteristics of this magnetic recording and reproducing apparatus were measured to find that it had good characteristics. From the above, magnetic recording and reproducing apparatuses of high performance and high reliability could be produced in good mass-productivity and high yields.

As the tape 26, a metal vapor-deposited tape of more than 1000 Oe, preferably more than 1500 Oe in coercive force is used, and high reliability recording and erasion can be carried out by the magnetic head of this Example.

Figure 25:
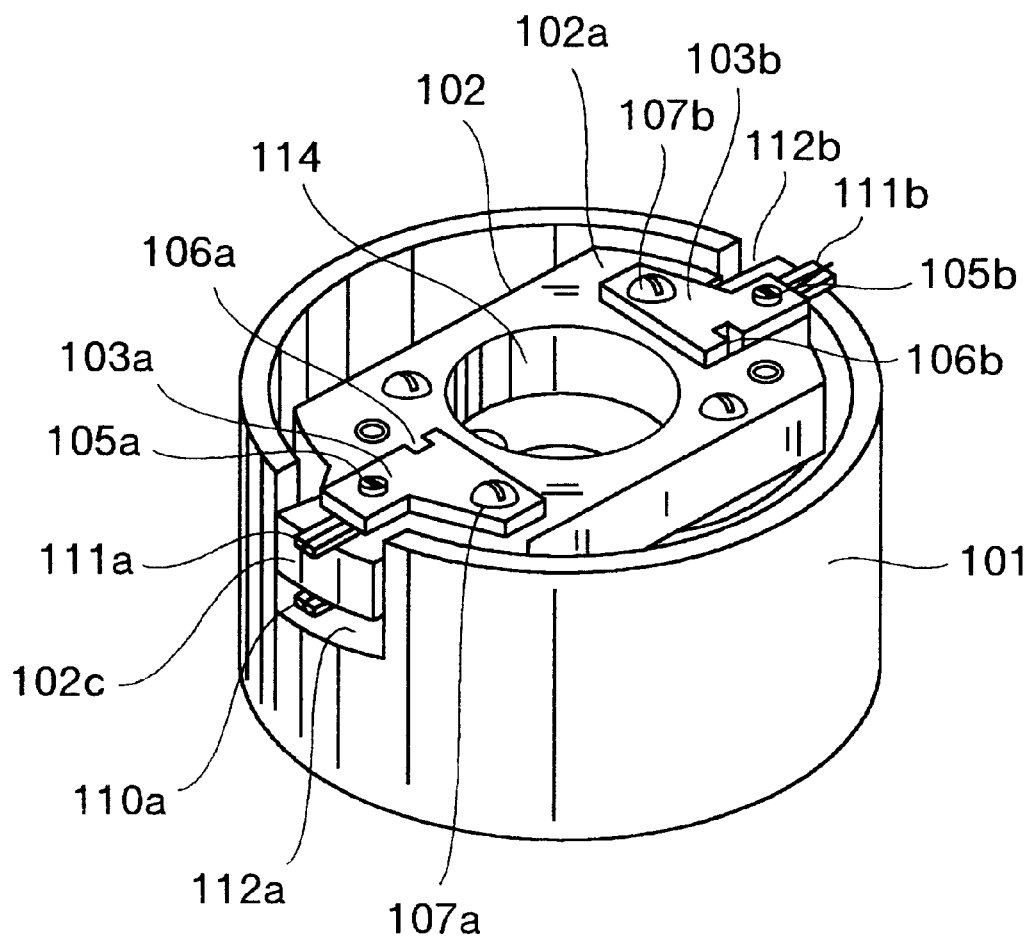
FIG. 25 is an oblique view of a rotating drum mounted with the magnetic head of the present invention.

FIG. 25 is a partial sectional view of a revolving cylinder for tape guide which constitutes the essential part of the present invention. The reference numeral 101 indicates a revolving cylinder which guides the magnetic tape to contact with the outer peripheral face. The fixed cylinder has a guiding part to guide the magnetic tape in a helical form to the outer periphery and is fixed at a substrate which is not shown. A bearing means is provided at the fixed cylinder and is an axis which is freely rotatably supported and a disk is bonded to the axis. The revolving cylinder 101 is fixed at this disk. The numerals 110a, 110b (not shown, but provided at the position opposite to 110a at an angle of 180°) indicate the heads for recording and reproducing the color signals provided for every field and comprise a magnetic thin plate such as of ferrite forming a given head cap. These are respectively bonded and fixed to head bases 104a, 104b (not shown). The head bases 104a, 104b are fixed to the back side 102a of the head support 102 by screws 108a and 108b, respectively. 104a and 104b have the same shapes as 103a and 103b, respectively. The numerals 111a, 111b similarly indicate the heads for recording and reproducing the luminance signals provided for every field and are respectively bonded and fixed to head bases 103a, 103b like the head chips 110a, 110b for the color signals. The head base 103a is fixed to another face 102a of the head support 102 by screw 107a. On the other hand, the head base 104a is fixed by screw 108a to the face 102b formed in the axial direction at a given space from the face 102a of the head support 102 in parallel to the face 102a. Since this head support 102 is formed so that there are no portions which project in the axial direction from the faces 102a (front side) and 102b (back side), the size of thickness and parallelism of the faces 102a and 102b can be highly accurately and simply processed by lapping, etc.

Figure 26:
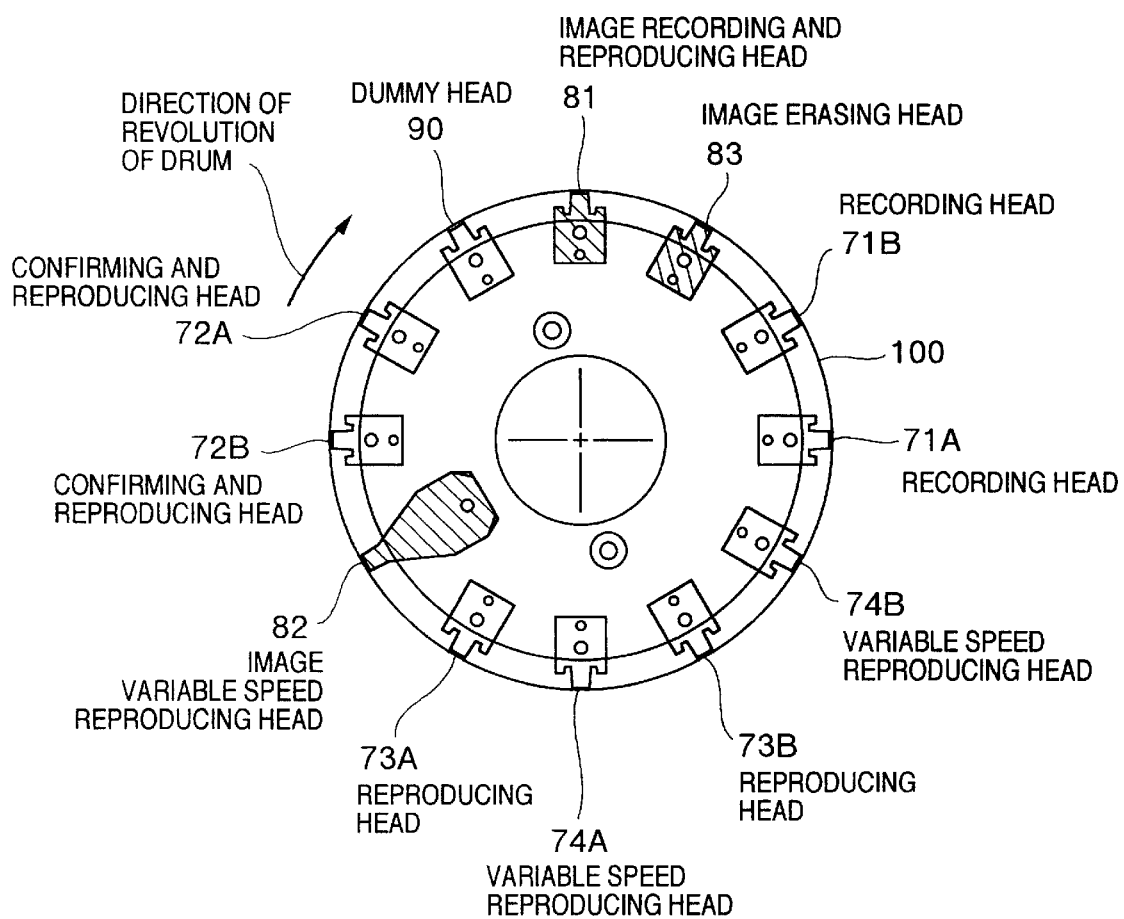
FIG. 26 is a front view of a rotating drum mounted with the magnetic head of the present invention.

FIG. 26 is a top view of a revolving cylinder mounted with a magnetic head of another example of the present invention. In the figure, (71A), (71B) show recording heads for sound signals, (72A), (72B) show reproducing heads for confirmation of recording of sound signals, (73A), (73B) show reproducing heads for sound signals, and (74A), (74B) show reproducing heads for sound signals at the time of variable speed reproduction of image signals. Further, (81) shows a recording and reproducing head for image signals, (82) shows a variable speed reproducing head for image signals, and (83) shows an erasing head for image signals.

The number of the heads for recording and reproducing of sound signals is eight in total and that of the heads for image signals is three, and it is impossible to provide the eleven heads in total in well-balanced state especially in the arrangement of the recording and reproducing heads (81) for image signals and the variable speed reproducing heads (82). Therefore, as shown in this figure, a dummy head 90 for balancing is provided and the twelve heads in total are arranged at the same intervals.

There are various combination in this arrangement. Furthermore, sixteen heads can be arranged with four in peripheral direction and four in longitudinal direction.

This Example can be applied to the new development of high-vision. Table 14 shows main specification of 32 inch direct vision type display and Table 15 shows main specification of extended definition projection type display. The screen size of the latter is from 53 inch type to 250 inch type and the scanning frequency is 35 kHz in horizontal direction or multi-scanning of up to 70 kHz.

Figure 27:
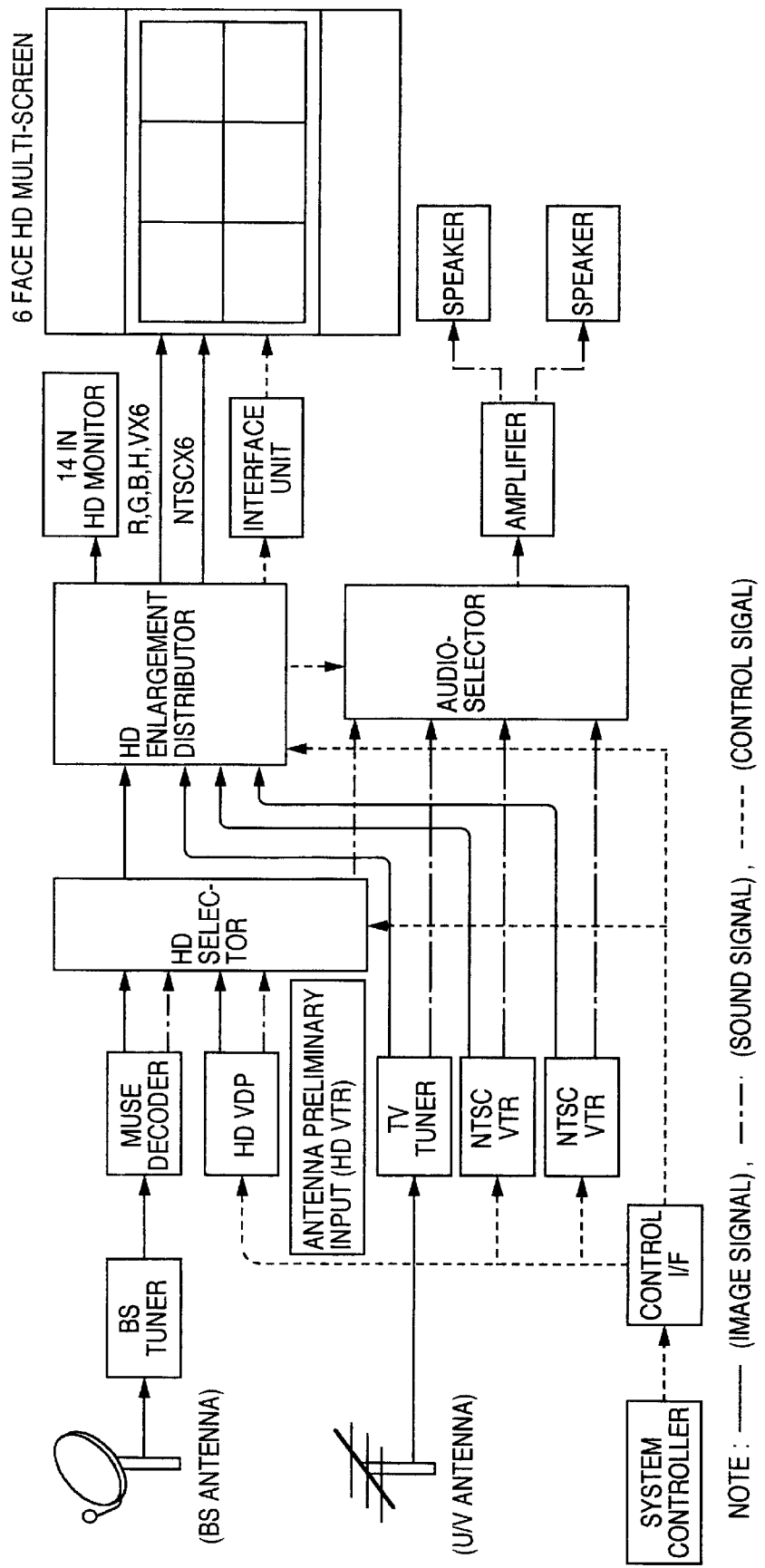
FIG. 27 is a diagram of a high-definition multi-system.

FIG. 27 is a standard system diagram of six screen high-vision multi-system. The high vision signals are distributed to the respective displays with extended definition (ED) signals by a high vision enlargement distributor and each display is of sequential scanning of 525 scanning lines.

In a high vision for business use, the relative speed of a tape is 51.5 m/sec or higher and a high head performance is required as mentioned above. For public use, a relative speed of 20 m/sec or higher is required.

TABLE 15

| Item | Specification |
| --- | --- |
| Horizontal frequency | 31.4 (ED)/33.75 (HD) kHz |
| Perpendicular frequency | 60 Hz |
| Horizontal resolution | 800 TV (HD) |
| Perpendicular resolution | 750 TV (HD) |
| Luminance (white peak) | 720 cd/m |
| Size of screen | 32 in. |
| Aspect ratio | 9:16 |
| Electric source | AC 100 V, 50/60 Hz |
| Consumed power | 300 W |

TABLE 16

| Name of model | C53-3500R | C53-3510R | C85-4500R | C85-4510R |
| --- | --- | --- | --- | --- |
| Scanning frequency | | | | |
| Horizontal | 24(15)~35 kHz (6 cycles) | 24(15)~70 kHz (15 cycles) | 24(15)~35 kHz (6 cycles) | 24(15)~70 kHz (15 cycles |
| Perpendicular | 40~120 Hz (6 cycles) | 40~120 Hz (15 cycles) | 40~120 Hz (6 cycles) | 40~120 Hz (15 cycles) |
| Resolution (100% display) | | | | |
| Horizontal | 800 TV or more | 800 TV or more | 800 TV or more | 800 TV or more |
| Perpendicular | 750 TV | 750 TV | 750 TV | 750 TV |
| Luminance (white peak) | 410 cd/m$^2$ | 540 cd/m$^2$ | 240 cd/m$^2$ | 340 cd/m$^2$ |
| Contrast ratio | 140:1 or more | 140:1 or more | 140:1 or more | 140:1 or more |
| Direct vision range | | | | |
| Horizontal | 80° p-p | 90° p-p | 90° p-p | 90° p-p |
| Perpendicular | 30° p-p | 30° p-p | 30° p-p | 30° p-p |
| Screen size (Aspect ratio) | 53 in. (9:16) | 53 in. (9:16) | 65 in. (9:16) | 65 in. (9:16) |
| Electric source | AC 100V, 50/60 Hz | AC 100V, 50/60 Hz | AC 100V, 50/60 Hz | AC 100V, 50/60 Hz |
| Consumed power | 420 W (800 VA) | 550 W (800 VA) | 420 W (600 VA) | 550 W (800 VA) |

TABLE 16-continued

| Name of model | C110-5000R | C110-5110R (HD) | C250-8510R | C250-8510 (with mirror) |
|---|---|---|---|---|
| Scanning frequency | | | | |
| Horizontal | 24(15)~35 kHz (6 cycles) | 15#75 kHz (10 cycles) | 24(15)~7O kHz (15 cycles) | 24(15)~7O kHz (15 cycles) |
| Perpendicular | 40~120 Hz (6 cycles) | 40~120 Hz (20 cycles) | 40~120 Hz (15 cycles) | 40~120 Hz (15 cycles) |
| Resolution (100% display) | | | | |
| Horizontal | 800 TV or more | 800 TV or more | 800 TV or more | 800 TV or more |
| Perpendicular | 750 TV | 750 TV | 750 TV | 750 TV |
| Luminance (white peak) | 140 cd/m$^2$ | 300 cd/m$^2$ | 70 cd/m$^2$ | 60 cd/m$^2$ |
| Contrast ratio | 140:1 or more | 80:1 | 140:1 or more | 140:1 |
| Direct vision range | | | | |
| Horizontal | 90° p-p | 90° p-p | 90° p-p | 90° p-p |
| Perpendicular | 40° p-p | 40° p-p | 40° p-p | 40° p-p |
| Screen size (Aspect ratio) | 110 in. (9:16) | 110 in. (9:16) | 250 in. (9:16) | 250 in. (9:16) |
| Electric source | AC 100V, 50/60 Hz | AC 100V, 50/60 Hz | AC 100V, 50/60 Hz | AC 100V, 50/60 Hz |
| Consumed power | 750 W (1,120 VA) | 1,140 W (2,000 VA) | 2,200 W (3,200 VA) | 2,200 W (3,200 VA) |

EXAMPLE 13

Figure 28:
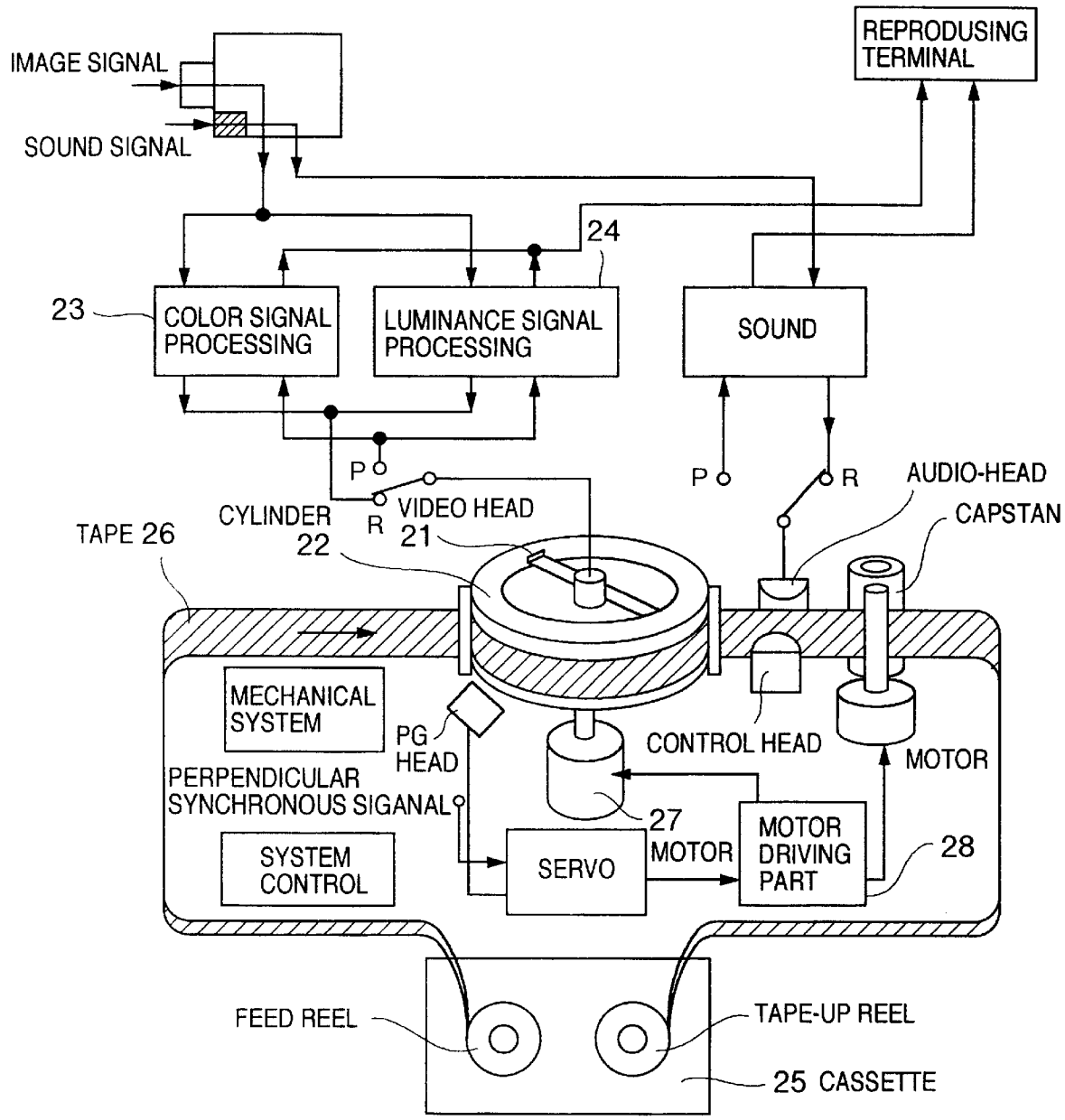
FIG. 28 is a block diagram of a 6 mm digital VCR of the present invention.

FIG. 28 shows one example of a schematic structural view of a 6 mm digital VTR made in accordance with the present invention. The respective signal processings and construction of the sliding system around the magnetic head were the same as those of FIG. 24. The image signals taken in through the optical system and the sound signals taken in through the microphone are transmitted to the writing head fitted to the cylinder 22 and the audio head, respectively, thereby to-carry out writing in the medium. The signal reproduction from the medium is sent to the reproducing terminal from the reading head.

EXAMPLE 14

Figure 29:
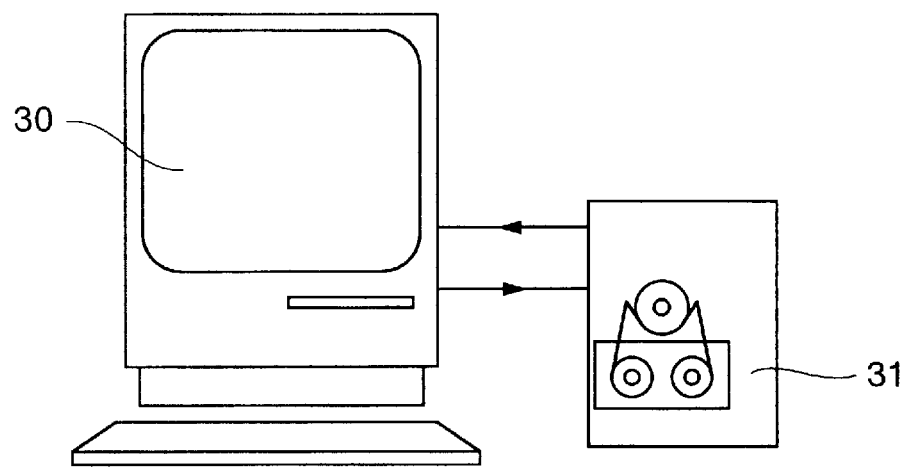
FIG. 29 is a block diagram of a 6 mm digital videocassette of the present invention.

FIG. 29 shows a schematic construction of one example of a 6 mm digital videocassette (6 mm-DVC) made in accordance with the present invention. In FIG. 29, 30 indicates a personal computer or a work station and 31 indicates the 6 mm-DVC of the present invention. The image information prepared in 30, such as computer graphics was recorded and stored in the 6 mm-DVC. Furthermore, the information from the 6 mm-DVC was processed by the computer. By fitting to 31 a software having the information obtained from FIG. 24, FIG. 27, etc. as a videocassette, the information could be processed by 30.

EXAMPLE 15

Figure 30:
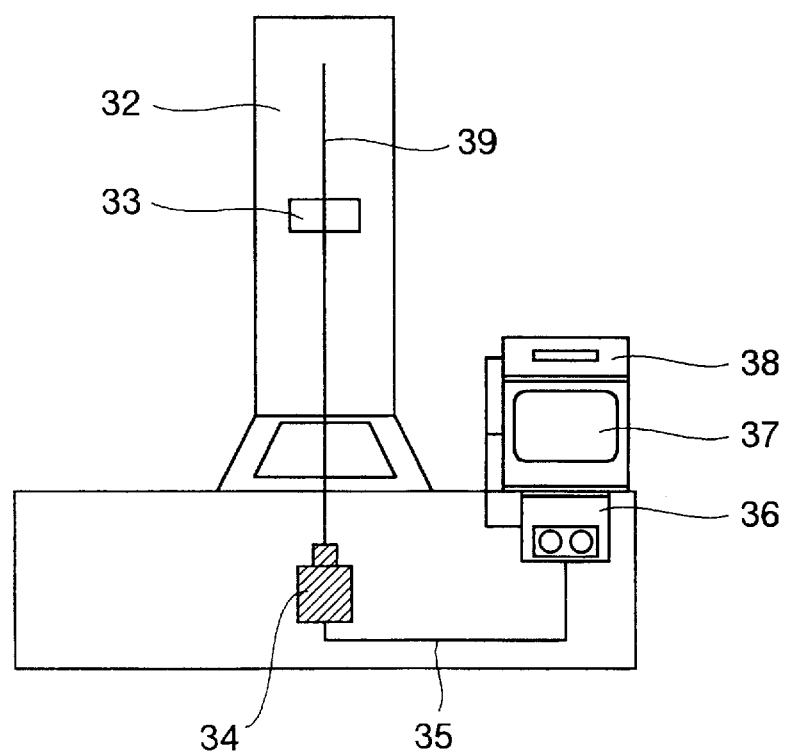
FIG. 30 is a block diagram of a transmission electron microscope of the present invention.

FIG. 30 shows a construction of a digital videocassette fitted to a transmission type electron microscope which was made in accordance with the present invention. In this figure, 32 indicates a lens tube, 33 indicates a specimen, 34 indicates a detector for electron rays, 35 indicates a fiber cable, 36 indicates a digital videocassette, 37 indicates a monitor, 38 indicates a digital printer, and 39 indicates an electron ray. The intensity information of the electron ray which passed through the specimen is converted to photo-signals by the detector and is input in the digital videocassette 36. This information can be not only microscopically examined with observing the screen of extended definition by the monitor 37, but also printed to obtain an image of extended definition over a photograph obtained by printing on a photographic paper.

Simultaneously, analysis of the composition of the specimen could be conducted by collecting the information of characteristic X rays generated from the specimen and collecting in 36.

EXAMPLE 16

Figure 31:
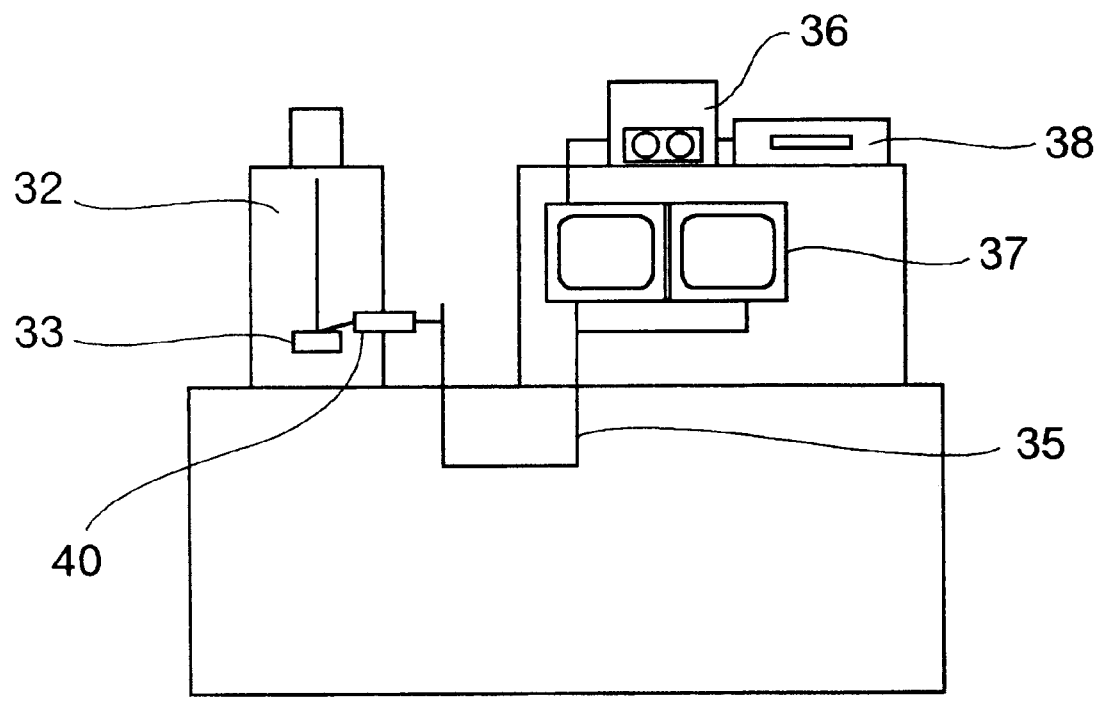
FIG. 31 is a block diagram of a scanning electron microscope of the present invention.

FIG. 31 shows a construction of a digital videocassette which was made in accordance with the present invention and fitted to a scanning electron microscope. In this figure, 40 indicates a detector for secondary ray, reflection electron, etc. In this case, too, images of extended definition could be obtained as in the case of the transmission type electron microscope of FIG. 30.

According to the sealing glass of the present invention, mechanical strengths such as micro Vickers hardness and three-point bending strength can be greatly improved without increasing the characteristic temperature. Furthermore, when a structure is made using the sealing glass, glass bonding portions of high reliability equal to or higher than those of the conventional glasses of high characteristic temperatures can be obtained even for the parts of low resisting temperatures.

Furthermore, when magnetic heads are made by carrying out the bonding using the sealing glass of the present invention at lower than the resisting temperature of magnetic films of high saturated magnetic flux density such as those of Fe—C type, the resulting magnetic heads do not break even when the sliding width of the magnetic head and the magnetic recording medium is 65 μm and the relative speed with the magnetic recording medium is 20 m/sec or higher. Furthermore, by sliding the magnetic recording medium under the above conditions, magnetic heads and magnetic recording and reproducing apparatuses having a high magnetic recording and reproducing characteristic and a high reliability can be provided.

Moreover, the magnetic head having a novel construction according to the present invention can be reduced to less than half in its weight. Therefore, power consumed by the motor revolving the cylinder can be reduced. Besides, since fitting of coil is completed only by fitting a wound coil into the magnetic head, the conventional coil winding step can be considerably simplified. Further, the height of head is less than half that of the conventional heads and, hence, the time required for cutting can be shortened. Alternatively, by carrying out the cutting more slowly than usual, working yield of head chips can be improved and head chips of less chipping can be obtained.

What is claimed is:

1. A glass containing a matrix and particles, wherein
   said particles are dispersed in said matrix and
   said particles contain a rare earth element, wherein the rare earth element is at least one of Sc, Y, Pr, Nd, Sm, Eu, Gd, Tb, Dy, Ho, Tm, Yb, or Lu.

2. A glass according to claim 1, wherein the glass is a borosilicate glass comprising silicon oxide and containing boron, sodium and aluminum.

3. A glass according to claim 1, wherein the glass is a soda-lime glass comprising silicon oxide and containing sodium and calcium.

4. A glass according to claim 1, wherein the particles have a particle size of 1–50 nm.

5. A glass according to claim 1, wherein said matrix comprises a heavy metal oxide and one or more additional oxides selected from the group consisting of boron oxide and silicon oxide.

6. A glass according to claim 1, said glass including, in terms of the following oxides, PbO, $B_2O_3$, $SiO_2$, and $Ln_2O_3$ (Ln being at least one of Sc, Y, Pr, Nd, Sm, Eu, Gd, Th, Dy, Ho, Er, Tm, Yb, or Lu).

7. A glass according to claim 1, wherein the particles have a particle size of 3–10 nm.

8. A glass according to claim 6, wherein said glass includes 30–93% by weight of said PbO, 25% by weight or less of said $B_2O_3$, 30% by weight or less of said $SiO_2$, 6–50% by weight of said $B_2O_3$ and said $SiO_2$ in total, and 0.3–3.0% by weight of said $Ln_2O_3$.

9. A glass according to claim 1, wherein said particles are $Ln_2O_3$.

10. A glass according to claim 1, wherein
    said matrix includes filler material that reduces the thermal expansion coefficient of the glass, and
    said filler material is dispersed in said matrix.

11. A glass according to claim 10, wherein said filler material includes $ZrSiO_4$, $PbTiO_3$, β-eucryptite or quartz glass.

12. A method of using a glass of claim 1 comprising the steps of:
    heating the glass to melt;
    cooling the melted glass; and
    holding temperature of the glass lower than the melting temperature to accelerate depositing of the particles.

13. A method according to claim 12, wherein the step of cooling has a 1–2° C./sec cooling speed.

14. A method according to claim 13, wherein the step of holding temperature includes holding temperature at 70° C. lower than the melting temperature.

15. The glass according to claim 1, wherein the rare earth element is in the form of an element, an oxide, a compound, or combinations thereof.

16. A sealing glass containing a matrix and particles, wherein
    said particles are dispersed in said matrix and
    said particles contain a rare earth element, wherein the rare earth element is at least one of Sc, Y, Pr, Nd, Sm, Eu, Gd, Tb, Dy, Ho, Tm, Yb, or Lu.

17. A glass according to claim 5, wherein said heavy metal oxide is an oxide of lead.

18. A sealing glass according to claim 16, wherein the sealing glass is stick shaped.

19. A method of producing glass comprising the steps of:
    mixing the ingredients of a glass;
    melting the mixed ingredients; and
    depositing particles in the fusion; wherein
    said ingredients include PbO, $B_2O_3$, $SiO_2$, $Ln_2O_3$ (Ln being at least one of Sc, Y, Pr, Nd, Sm, Eu, Gd, Th, Dy, Ho, Er, Tm, Yb or Lu); and
    said particles contain a rare earth element.

20. A method according to claim 19, wherein
    the step of melting includes a step of stirring the fusion of the ingredients by ultrasonic waves.

21. A method according to claim 19 wherein
    the step of depositing includes a step of cooling the fusion of the ingredients.

22. A method according to claim 19, wherein said ingredients include, 30–93% by weight of said PbO, 25% by weight or less of said $B_2O_3$, 30% by weight or less of said $SiO_2$, 6–50% by weight of said $B_2O_3$ and said $SiO_2$ in total and 0.3–3.0% by weight of said $Ln_2O_3$.

23. A method of producing glass the steps of:
    providing the glass of claim 1 in broken form;
    mixing said broken glass with filler material that reduces the thermal expansion coefficient of said glass;
    sintering said glass and said filler material.

24. A method according to claim 23, wherein the step of sintering includes a step of heating the mixture of said glass and said filler material.

25. A structure comprising;
    a substrate; and
    the sealing glass of claim 16, coated on the surface of said substrate.

26. A structure comprising;
    a pair of substrates; and
    the sealing glass of claim 16 which bonds said substrates.

* * * * *

UNITED STATES PATENT AND TRADEMARK OFFICE
CERTIFICATE OF CORRECTION

PATENT NO.   : 6,150,027
DATED        : November 21, 2000
INVENTOR(S)  : Hiroki Yamamoto et al.

It is certified that error appears in the above-identified patent and that said Letters Patent is hereby corrected as shown below:

Column 1,
Lines 38 and 40, change "gausses" to -- Gauss --.

Column 2,
Line 7, change "than" to -- over the --.
Line 10, change "glass" to -- glasses --.
Line 16, change "can hardly stand" to -- cannot withstand --.

Column 3,
Line 6, change "$SiO_{2:6-40}\%$" to -- $SiO_2$: 6-40% --.

Column 7,
Line 42, delete "also".

Column 9,
Line 49, change "Vichers" to -- Vickers --.

Column 10,
Line 20, After "ultrasonic" insert -- vibration --.

Column 12,
Line 48, change "tempera– ture" to -- temperature --.

Column 24,
Line 42, change "Exampl" to -- Example --.
Line 48, change "wettability" to -- weddability --.

Column 25,
Line 3, change "gausses" to -- Gauss --.
Line 57, change "galsses" to -- glasses --.
Column 29,
Line 65, change "earthed" to -- grounded --.

Column 33,
Line 5, change "15#75 kHz" to -- 15~75 kHz --.
Line 41, change "to-carry" to -- to carry --.

UNITED STATES PATENT AND TRADEMARK OFFICE
CERTIFICATE OF CORRECTION

PATENT NO.   : 6,150,027
DATED        : November 21, 2000
INVENTOR(S)  : Hiroki Yamamoto et al.

It is certified that error appears in the above-identified patent and that said Letters Patent is hereby corrected as shown below:

Column 35,
Lines 48-49, delete the entire claim and replace with the following claim:
-- 7. A glass according to claim 6, said glass further including 0-25% by weight of at least one of ZnO, $Al_2O_3$ and $R_2O$ (R being an alkali metal element). --

Column 36,
Line 46, after "glass" insert -- comprising the --.

Signed and Sealed this

Twenty-fifth Day of December, 2001

Attest:

Attesting Officer

JAMES E. ROGAN
Director of the United States Patent and Trademark Office